US008879986B2

(12) United States Patent
Fisher

(10) Patent No.: US 8,879,986 B2
(45) Date of Patent: *Nov. 4, 2014

(54) WIRELESS BIDIRECTIONAL COMMUNICATIONS BETWEEN A MOBILE DEVICE AND ASSOCIATED SECURE ELEMENT USING INAUDIBLE SOUND WAVES

(75) Inventor: Michelle Fisher, Oakland, CA (US)

(73) Assignee: Michelle Fisher, Oakland, CA (US)

(*) Notice: Subject to any disclaimer, the term of this patent is extended or adjusted under 35 U.S.C. 154(b) by 31 days.

This patent is subject to a terminal disclaimer.

(21) Appl. No.: 13/341,830

(22) Filed: Dec. 30, 2011

(65) Prior Publication Data
US 2013/0203345 A1 Aug. 8, 2013

Related U.S. Application Data

(63) Continuation-in-part of application No. 12/948,717, filed on Nov. 17, 2010, now Pat. No. 8,559,987, which is a continuation-in-part of application No. 11/467,441, filed on Aug. 25, 2006, now abandoned.

(60) Provisional application No. 61/429,246, filed on Jan. 3, 2011, provisional application No. 60/766,171, filed on Dec. 31, 2005, provisional application No. 60/766,172, filed on Dec. 31, 2005.

(51) Int. Cl.
H04B 5/00 (2006.01)
H04B 1/38 (2006.01)
H04B 11/00 (2006.01)

(52) U.S. Cl.
CPC .............. *H04B 1/3816* (2013.01); *H04B 11/00* (2013.01)
USPC ................... 455/41.1; 455/550.1; 455/556.1; 455/557; 455/558

(58) Field of Classification Search
USPC ............................ 455/550.1, 556.1, 557, 558
See application file for complete search history.

(56) References Cited

U.S. PATENT DOCUMENTS

| 6,038,367 A | 3/2000 | Abecassis |
| 6,128,655 A | 10/2000 | Fields et al. |
| 6,141,666 A | 10/2000 | Tobin |
| 6,199,082 B1 | 3/2001 | Ferrel et al. |
| 6,415,156 B1 | 7/2002 | Stadelmann |
| 6,605,120 B1 | 8/2003 | Fields et al. |
| 6,772,396 B1 | 8/2004 | Cronin et al. |
| 6,886,017 B1 | 4/2005 | Jackson et al. |

(Continued)

OTHER PUBLICATIONS

Office Action for U.S. Appl. No. 11/933,321 dated Nov. 29, 2011.

(Continued)

*Primary Examiner* — Fayyaz Alam

(57) ABSTRACT

In some embodiments, a system includes a mobile communication device and a secure element physically coupled to the mobile communication device. The mobile communication device includes a first wireless transceiver, first processor, first memory, first speaker, first microphone, and first Audio To Digital conversion (ADC). The secure element includes a second wireless transceiver, second processor, second memory, second speaker, second microphone, a second Audio To Digital converter (ADC), and a second Digital to Audio converter (DAC). The mobile communication device is configured to transmit data via the first speaker to the secure element microphone using inaudible sound waves. The secure element is configured to transmit data wirelessly via the second speaker to the mobile communication device using inaudible sound waves.

23 Claims, 21 Drawing Sheets

(56) References Cited

U.S. PATENT DOCUMENTS

| | | |
|---|---|---|
| 7,379,920 B2 | 5/2008 | Leung et al. |
| 7,482,925 B2 | 1/2009 | Hammad et al. |
| 7,522,905 B2 | 4/2009 | Hammad et al. |
| 7,784,684 B2 | 8/2010 | Labrou |
| 7,991,434 B2 * | 8/2011 | Yen et al. .................. 455/558 |
| 8,544,753 B2 * | 10/2013 | Antebi et al. ................ 235/492 |
| 2002/0065774 A1 | 5/2002 | Young |
| 2002/0077918 A1 | 6/2002 | Lerner et al. |
| 2002/0107756 A1 | 8/2002 | Hammons et al. |
| 2002/0169984 A1 | 11/2002 | Kumar |
| 2003/0065805 A1 | 4/2003 | Barnes |
| 2003/0093695 A1 | 5/2003 | Dutta |
| 2003/0163359 A1 | 8/2003 | Kanesaka |
| 2004/0006497 A1 | 1/2004 | Nestor et al. |
| 2004/0030658 A1 | 2/2004 | Cruz |
| 2004/0235450 A1 | 11/2004 | Rosenberg |
| 2004/0235502 A1 | 11/2004 | Kim |
| 2004/0243519 A1 | 12/2004 | Pertilla |
| 2004/0267618 A1 | 12/2004 | Judicibus et al. |
| 2005/0215231 A1 | 9/2005 | Bauchot et al. |
| 2007/0022058 A1 | 1/2007 | Labrou |
| 2007/0095892 A1 | 5/2007 | Lyons et al. |
| 2007/0255662 A1 | 11/2007 | Tumminaro |
| 2007/0270166 A1 | 11/2007 | Hampel |
| 2008/0045172 A1 | 2/2008 | Narayanaswami et al. |
| 2008/0051142 A1 | 2/2008 | Calvet et al. |
| 2008/0139155 A1 | 6/2008 | Boireau et al. |
| 2008/0167988 A1 | 7/2008 | Sun et al. |
| 2008/0177668 A1 | 7/2008 | Delean |
| 2008/0208762 A1 | 8/2008 | Arthur |
| 2008/0294556 A1 | 11/2008 | Anderson |
| 2008/0305774 A1 | 12/2008 | Ramakrishna |
| 2009/0098825 A1 | 4/2009 | Huomo et al. |
| 2009/0100477 A1 | 4/2009 | Jeffs |
| 2010/0063895 A1 | 3/2010 | Dominguez et al. |
| 2010/0323678 A1 * | 12/2010 | Corda et al. .................. 455/418 |

OTHER PUBLICATIONS

Office Action for U.S. Appl. No. 11/933,321 dated Jun. 23, 2011.
Office Action for U.S. Appl. No. 11/944,267 dated Sep. 7, 2011.
Office Action for U.S. Appl. No. 11/948,903 dated Sep. 13, 2011.
Office Action for U.S. Appl. No. 11/933,351 dated May 25, 2011.
Office Action for U.S. Appl. No. 11/933,321 dated May 27, 2010.
Office Action for U.S. Appl. No. 11/933,337 dated May 27, 2010.
Office Action for U.S. Appl. No. 12/592,581 dated Jun. 4, 2010.
Office Action for U.S. Appl. No. 11/939,821 dated Aug. 17, 2010.
Office Action for U.S. Appl. No. 11/933,351 dated Aug. 18, 2010.

* cited by examiner

WIRELESS BIDIRECTIONAL COMMUNICATIONS BETWEEN A MOBILE DEVICE AND ASSOCIATED SECURE ELEMENT USING INAUDIBLE SOUND WAVES

PRIORITY CLAIMS

This application is a continuation-in-part and claims priority to U.S. Provisional Patent Application No. 61/429,246 filed on Jan. 3, 2011 which is a continuation in part of U.S. patent application Ser. No. 12/948,717 entitled "Wireless Bidirectional Communications between a Mobile Device and Associated Secure Element," filed Nov. 17, 2010 and U.S. patent application Ser. No. 11/933,321, titled "Method and System for Adapting a Wireless Mobile Communication Device for Wireless Transactions," filed Oct. 31, 2007, both of which are a continuation-in-part of U.S. patent application Ser. No. 11/467,441, titled "Method and Apparatus for Completing a Transaction Using a Wireless Mobile Communication Channel and Another Communication Channel," filed Aug. 25, 2006, which claims priority to U.S. Provisional Patent Application Nos. 60/766,171 and 60/766,172, both of which are entitled "Method and Apparatus for Completing a Transaction Using a Wireless Mobile Communication Channel and Another Communication Channel" and were filed Dec. 31, 2005. All of the above-referenced patent applications are incorporated by reference herein in their entirety.

RELATED APPLICATIONS

Other patents referenced include U.S. patent application Ser. No. 13/312,049 entitled, "Non-Wireless Bidirectional Communication Between A Mobile Device And Associated Secure Element Using An Audio Port" filed on Dec. 6, 2011, U.S. patent application Ser. No. 13/308,440 entitled "Automatic Redemption Of Digital Artifacts Using An NFC Enabled Mobile Device" filed on Nov. 30, 2011, U.S. patent application Ser. No. 13/229,004, entitled "Streamlining NFC Transactions With Multiple Secure Elements" filed on Sep. 9, 2011, U.S. patent application Ser. No. 13/221,706, entitled, "Dynamic Provisioning of NFC Applications" filed Aug. 30, 2011, U.S. patent application Ser. No. 13/216,098 entitled, "Streamlining NFC Transactions Using A Mobile Communication Device" filed on Aug. 23, 2011 which is a continuation in part and claims priority to U.S. patent application Ser. No. 13/215,069 entitled "Transferring Data From an NFC Enabled Mobile Device to a Remote Device" filed on Aug. 22, 2011 which is a continuation in part of U.S. patent application Ser. No. 13/213,840, entitled "Transferring Data Between NFC Enabled Mobile Devices With Multiple Secure Elements" filed on Aug. 19, 2011 which is a continuation in part and claims priority to U.S. patent Ser. No. 13/208,247, entitled "Transferring Data Between NFC Enabled Mobile Devices" filed on Aug. 11, 2011 which is a continuation in part of U.S. patent Ser. No. 13/184,209, entitled "Method and Systems of loading and unloading digital artifacts between a mobile device with an associated secure element and other remote devices" filed on Jul. 15, 2011 which claims priority to U.S. Provisional Patent Application No. 61/442,384, entitled "Method and Systems of loading and unloading digital between a mobile device with an associated secure element and other remote devices" filed on Feb. 14, 2011. Other patent applications referenced include U.S. patent application Ser. No. 13/184,246, entitled "Social Media Marketing Based On Transactions Using A Mobile Device And Associated Secure Element" filed on Aug. 1, 2011, U.S. patent application Ser. No. 13/184,246, entitled "Using a Mobile Device to Enable Purchase of Deals and Increase Customer Loyalty" filed on Jul. 15, 2011, U.S. patent application Ser. No. 11/944,267, entitled "Method and System for Delivering Information to a mobile communication device based on consumer transactions", filed Nov. 21, 2007 and U.S. patent application Ser. No. 11/956,261 entitled "Method and System for Delivering Customized Information To A Mobile Communication Device Based on User Affiliations", filed Dec. 13, 2007. All of the above-referenced patent applications are incorporated by reference herein.

TECHNICAL FIELD

The disclosed embodiments relate generally to wireless communications for a mobile device, and more particularly, to wireless communications between a mobile device and an associated secure element using sound waves.

BACKGROUND

A secure element can be physically coupled to a mobile communication device to allow for transactions with remote terminals such as point-of-sale and point-of-entry terminals. Implementing wireless communications between the mobile communication device and the secure element, however, presents challenges. For example, it is desirable to transmit data between the mobile communication device and the secure element in a manner that allows for easy receipt of the data especially in cases where a wireless carrier network or WIFI connection is not available. Also, a method of communication between the mobile communication device and the secure element should allow for convenient activation of the secure element and remote deactivation of the secure element.

SUMMARY

Disclosed embodiments allow a mobile communication device to communicate wirelessly with a secure element that is physically coupled to the mobile communication device. Communications from the mobile communication device to the secure element use a different protocol than communications from the secure element to the mobile communication device.

In some embodiments, a system includes a mobile communication device and a secure element physically coupled to the mobile communication device. The mobile communication device includes a first wireless transceiver, first processor, first memory, first microphone, first speaker, first audio to digital converter (ADC), and first battery. The secure element includes a second wireless transceiver, second processor, second memory, second microphone, second speaker, a second audio to digital converter (ADC), a second digital to audio converter (DAC), and second battery. The mobile communication device is configured to wirelessly transmit data via the first speaker the second microphone in the secure element using inaudible sound waves The secure element is configured to wirelessly transmit data via the second wireless speaker to the microphone in the mobile communication device also using inaudible sound waves In some embodiments, a method of communicating between a mobile communication device and a secure element physically coupled to the mobile communication device is performed. The mobile communication device includes a first microphone, first wireless transceiver, first processor, and first memory, and the secure element includes a second wireless transceiver, second processor, and second memory.

The method includes wirelessly transmitting data between the first microphone/speaker in the mobile communication device to the secure element via the second microphone/speaker using inaudible sound waves.

BRIEF DESCRIPTION OF THE DRAWINGS

Like reference numerals refer to corresponding parts throughout the drawings.

DESCRIPTION OF EMBODIMENTS

Reference will now be made in detail to various embodiments, examples of which are illustrated in the accompanying drawings. In the following detailed description, numerous specific details are set forth in order to provide a thorough understanding of the present inventions. However, it will be apparent to one of ordinary skill in the art that the present inventions may be practiced without these specific details. In other instances, well-known methods, procedures, components, and circuits have not been described in detail so as not to unnecessarily obscure aspects of the embodiments.

Figure 1:
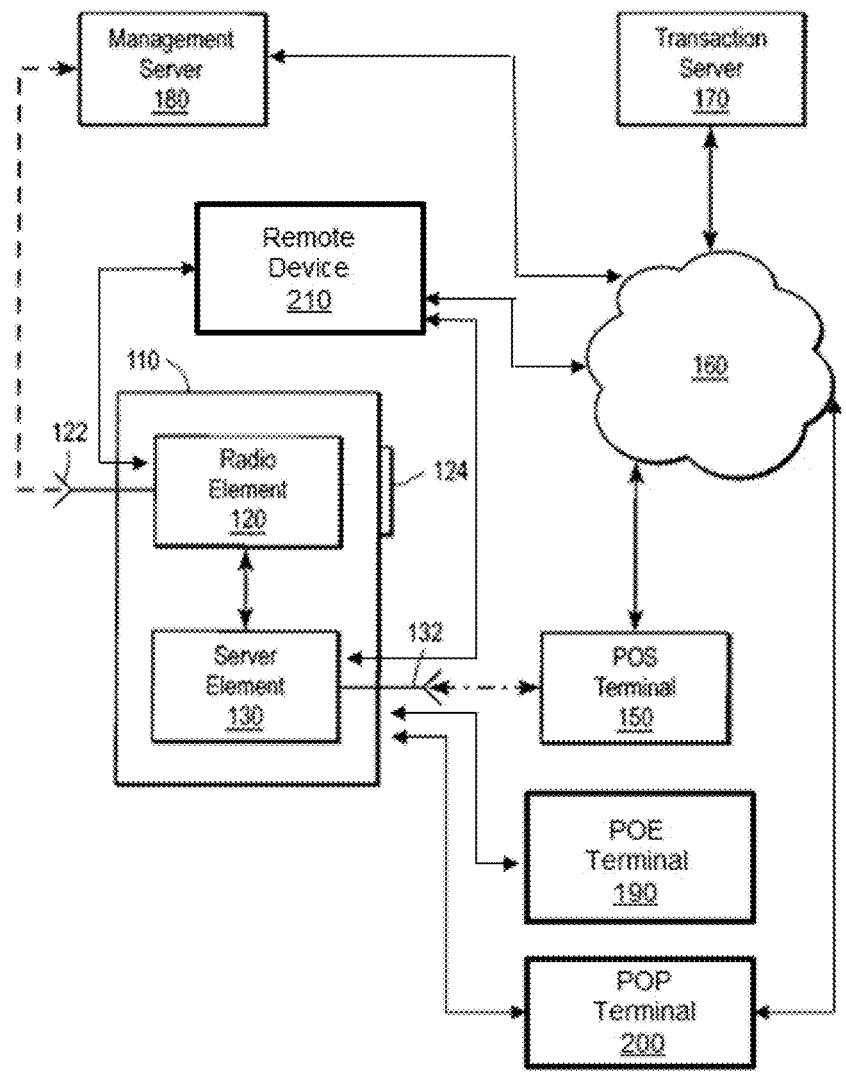
FIG. 1 is a block diagram illustrating a communication system in accordance with some embodiments.

FIG. 1 is a block diagram illustrating a communication system 100 in accordance with some embodiments. The communication system 100 includes a hand-held, wireless mobile communication device 110 with an antenna 120 for wireless communication. While the antenna 120 is shown as extending from the mobile communication device 110 for visual clarity, the antenna 120 may be implemented internally within the mobile communication device 110. Also, the mobile communication device 110 may include more than one antenna 120. The mobile communication device 110 includes a user interface for entering data. For example, a display 124 (FIG. 2) is a touch-screen display; alternatively or in addition, the mobile communication device 110 includes a keypad 125 (FIG. 2) for entering data.

A secure element 130 is physically coupled to the mobile communication device 110. In some embodiments, the secure element 130 is externally attached to the mobile communication device 110. For example, the secure element 130 is adhesively affixed or mechanically secured to the housing of the mobile communication device 110. Alternatively, the secure element 130 is housed within the mobile communication device 110. The secure element 130 includes an antenna 131 for wireless communication. While the antenna 131 is shown as extending from the secure element 130 for visual clarity, the antenna 131 may be implemented internally within the secure element 130. Also, the secure element 130 may include more than one antenna 131. Communication occurs wirelessly between the secure element 130 and the mobile communication device 110 via respective antennas 120 and 131, over a direct wireless channel 163 between the mobile communication device 110 and the secure element 130. Thus, in some embodiments, the channel 163 does not pass through a network.

The secure element 130 also can communicate wirelessly with different point-of-sale (POS) or point-of-entry (POE) terminals 150-1 to 150-N via the antenna 131. In some embodiments, a POS terminal 150 receives a transaction request signal from the secure element 130 and transmits the transaction request signal to a transaction server 170 over a network 160. Alternatively, a POE terminal 150 receives an entry request signal from the secure element 130 and transmits the entry request signal to the transaction server 170 over the network 160. The network 160 is any suitable wired and/or wireless network and may include, for example, a local area network (LAN), wide area network (WAN), virtual private network (VPN), the Internet, a metropolitan area network (MAN), or any combination of these or similar networks. The transaction server 170 verifies the request and forwards a verification signal to the management server 180 via the network 160. The management server 180 identifies the user corresponding to the verification signal and provides a response signal back to the mobile communication device 110, which the mobile communication device 110 receives via the antenna 120. The response signal thus is communicated back to the mobile communication device 110 using a communication channel that is different from the communication channel used to initiate the transaction. Alternatively, the response signal is communicated back to the mobile communication device 110 using communication channels from the management server 180 to the secure element 130 through the network 160 and POS terminal 150, and then from the secure element 130 to the mobile communication device 110 via the antennas 131 and 120.

In the example of an entry request signal received at a POE terminal 150, the entry request is verified by the POE terminal 150 or the transaction server 170, upon which the POE terminal 150 admits the user of the mobile communication device 110 to the corresponding venue or facility.

Figure 2:
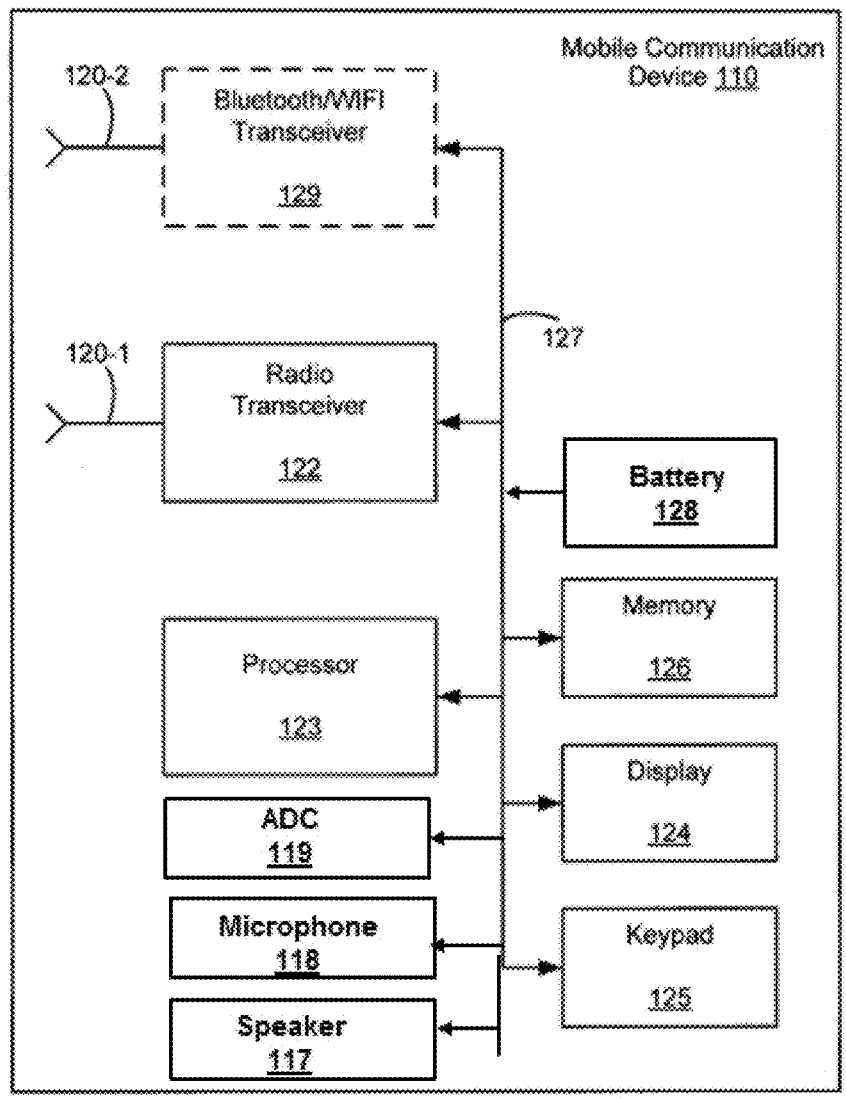
FIG. 2 is a block diagram illustrating selected elements of a mobile communication device in accordance with some embodiments.

FIG. 2 is a block diagram illustrating selected elements of the mobile communication device 110 in accordance with some embodiments. A processor 123 is coupled to a wireless radio transceiver 122, a display 124, a keypad 125, and a memory 126. The radio transceiver 122 is connected to an antenna 120-1, which is an example of an antenna 120 (FIG. 1) and is adapted to send outgoing voice and data signals and receive incoming voice and data signals over a radio communication channel. The radio communication channel can be a digital radio communication channel (e.g., a cellular channel as provided by a cellular service provider), such as a CDMA or GSM channel. Such a radio communication channel has the capacity to communicate both voice and data messages using conventional techniques. In some embodiments, the processor 123 also is coupled to a second wireless transceiver 129 (e.g., a Bluetooth or WiFi transceiver), connected to a corresponding antenna 120-2 (which is another example of an antenna 120, FIG. 1), for communicating with an external device over an additional communication channel separate from the radio communication channel associated with the transceiver 122.

Figure 6:
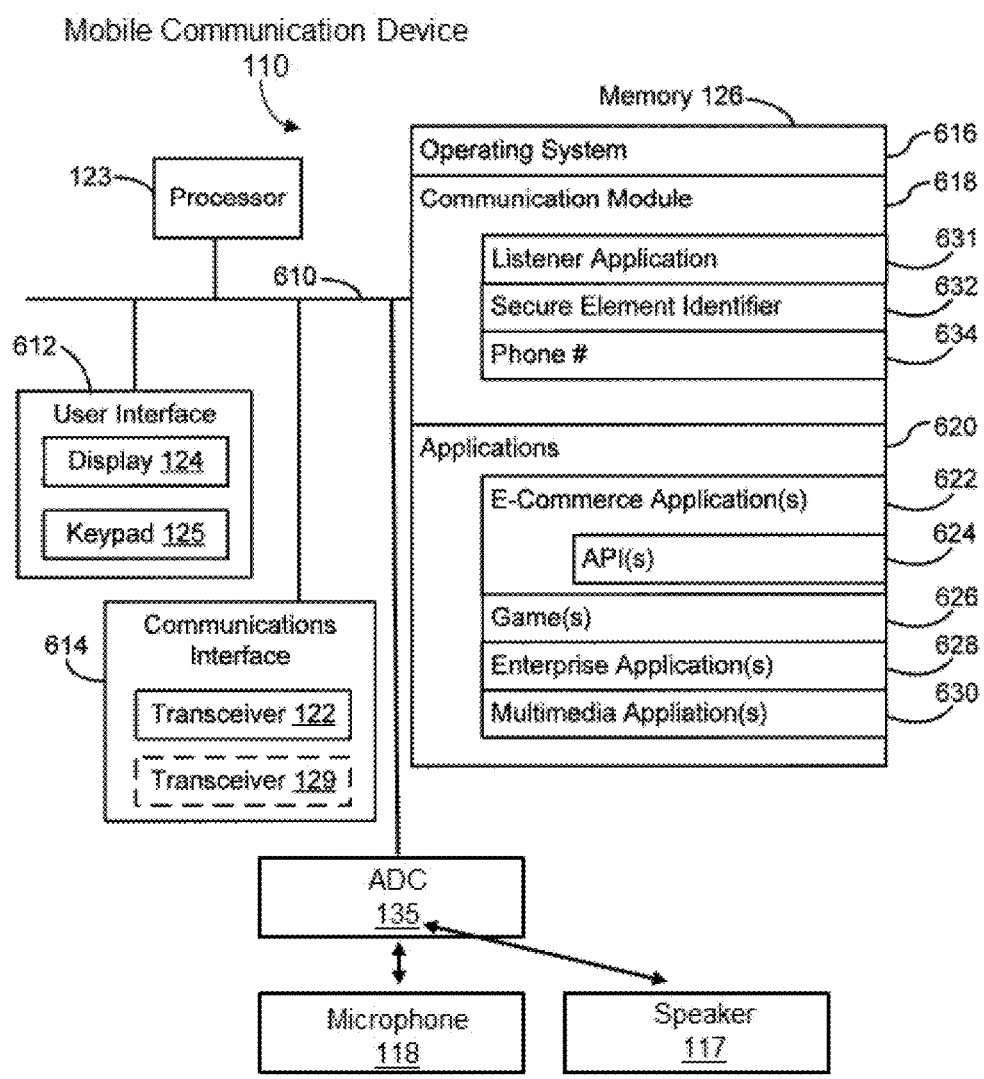
FIG. 6 is a block diagram illustrating selected elements of a mobile communication device in accordance with some embodiments.

The processor 123 has the capability to perform not only the radio communication services necessary to allow for phone and data communications (e.g., via the transceivers 122 and/or 129), but also to execute various application programs (e.g., applications 620, FIG. 6) that are stored in the memory 126. These application programs can receive inputs from the user via the display 124 and/or keypad 125. In some embodiments, application programs stored in the memory 126 and run on the processor 123 are, for example, iPhone, Android, Windows Mobile, BREW, J2ME, or other mobile applications and can encompass a broad array of application types. Examples of these applications include wallet e-commerce applications 622 (FIG. 6), games 626 (FIG. 6), enterprise applications 628 (FIG. 6), and multimedia applications 630 (FIG. 6). E-commerce applications can include ticketing applications; content, item and service purchase applications; and/or payment management applications. One example of an e-commerce application that runs on the processor 123 and is stored in the memory 126 is an event application that provides event information and ticketing (e.g., for movies, concerts, sports, airplanes, busses, trains, etc). In some implementations, the processor 123 recognizes secure communications (e.g., as received via the transceiver 122 and/or 129) and transmits data from the secure communications to the secure element 130 for storage therein. The processor 123 also processes data received from the secure element 130. These applications can be preinstalled on the mobile communications device or downloaded from the remote server to the mobile communications device using conventional wireless communications. Alternatively, these applications can be pre-installed on the secure element or downloaded from the remote server to the secure element. The secure element can then transfer these applications to the mobile communication device. Stated another way, if it's not possible to download the applications directly to the mobile device due to restrictions by wireless carriers and/or technical difficulties, they can be installed from the secure element where the applications are already pre-installed or the applications may downloaded from the remote transaction server 170 or management server 180.

Figure 3A:
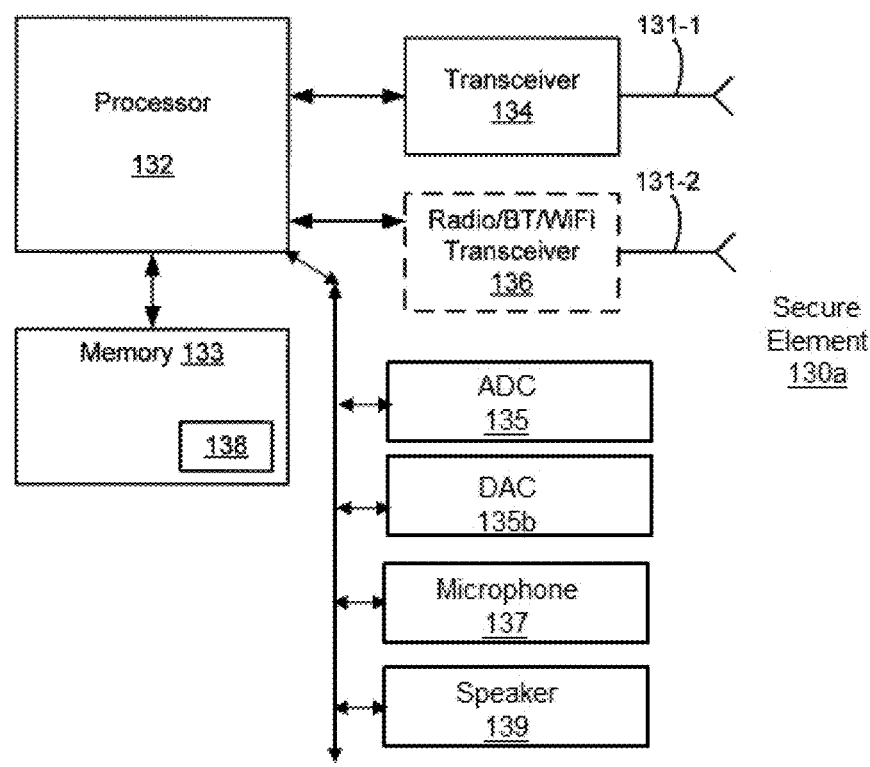
FIGS. 3A-3CC are block diagrams illustrating a secure element to be physically coupled to a mobile communication device in accordance with some embodiments.

An NFC enabled device is one that includes a secure element and enables contactless transactions which have been described in more detail in previous patents including U.S. patent application Ser. No. 13/184,246, entitled "Using a mobile device to enable purchase of deals and increase customer loyalty" filed on Jul. 15, 2011, U.S. Provisional Patent Application No. 61/445,667, entitled "Non-Wireless Bidirectional Communication Between a Mobile Device and Associated Secure Element using an Audio Port" filed on Feb. 23, 2011 and U.S. Provisional Patent Application No. 61/429, 246, entitled "Wireless Bidirectional Communications between a Mobile Device and Associated Secure Element using Inaudible Sound Waves," filed Jan. 3, 2011 both of which are a continuation in part of U.S. patent application Ser. No. 12/948,717, entitled "Wireless Bidirectional Communications between a Mobile Device and Associated Secure Element," filed Nov. 17, 2010, U.S. patent application Ser. No. 12/592,581 entitled "Method and Apparatus For Completing A Transaction Using A Wireless Mobile Communication Channel and Another Communication Channel", filed Nov. 25, 2009, U.S. patent application Ser. No. 11/948,903, entitled "Method And System For Conducting An Online Payment Transaction Using A Mobile Communication Device" filed on Nov. 30, 2007, U.S. patent application Ser. No. 11/939,821, entitled "Method and System for Securing Transactions Made Through a Mobile Communication Device" filed Nov. 14, 2007, and U.S. patent application Ser. No. 11/933,351 entitled "Method and System for Purchasing Event Tickets Using a Mobile Communication Device", filed Oct. 31, 2007, and U.S. patent application Ser. No. 11/933, 321 entitled "Method and System for Adapting a Wireless Mobile Communication Device for Wireless Transactions," filed Oct. 31, 2007 all of which are a continuation-in-part of U.S. patent application Ser. No. 11/467,441, entitled "Method and Apparatus for Completing a Transaction Using a Wireless Mobile Communication Channel and Another Communication Channel," filed Aug. 25, 2006, which claims priority to U.S. Provisional Patent Application Nos. 60/766, 171 and 60/766,172, both of which were filed Dec. 31, 2005. All of the above-referenced patent applications are incorporated by way of reference herein FIG. 3A is a block diagram illustrating a secure element 130a in accordance with some embodiments. The secure element 130a, which is an example of the secure element 130 (FIG. 1), includes a processor 132, a memory 133, and a wireless transceiver 134 with a corresponding antenna 131-1, a microphone 137, a speaker 139, an audio to digital converter 135, and a digital to audio converter 135b. The memory 133 includes a memory element 138 (e.g., a register, or alternatively a group of memory cells in a memory array in the memory 133) for storing an identifier (e.g., a serial number) associated with the secure element 130a. The memory element 138 is non-volatile and thus can store the identifier even in the absence of power. The transceiver 134 is adapted to communicate wirelessly with POS and POE terminals 150 (FIG. 1). For example, the transceiver 134 is adapted to send transaction request signals to POS terminals 150, to send entry request signals to POE terminals 150, and to receive corresponding responses from the terminals 150. In some embodiments, the transceiver 134 is a near-field communication (NFC) transceiver (e.g., operating in accordance with the ISO 14443A/B standard and/or ISO 18092 standard), which includes an NFC modem. In some implementations, the NFC modem has a set of registers that can be read and written by the processor 132 and are also available for reading and writing by an external device (e.g., a POS or POE terminal 150) over the wireless (e.g., RFID) communications channel between the transceiver 134 and the external device. This set of registers serves, for example, as a shared memory between the processor 132 within the secure element 130 and an RFID reader associated with a POS or POE terminal 150. This communication between the secure element 130*a* and POS or POE terminal 150 is performed, for example, in accordance with the ISO 14443A/B standard and/or the ISO 18092 standard.

In some embodiments, the secure element 130*a* includes one or more additional transceivers 136 (e.g., radio, Bluetooth, and/or WiFi transceivers) and associated antennas 131-2. The one or more additional transceivers 136 are adapted to communicate wirelessly with the mobile communication device 110 (e.g., via the transceiver 122 and/or 129 (FIG. 2) in the mobile communication device 110).

Figure 3B:
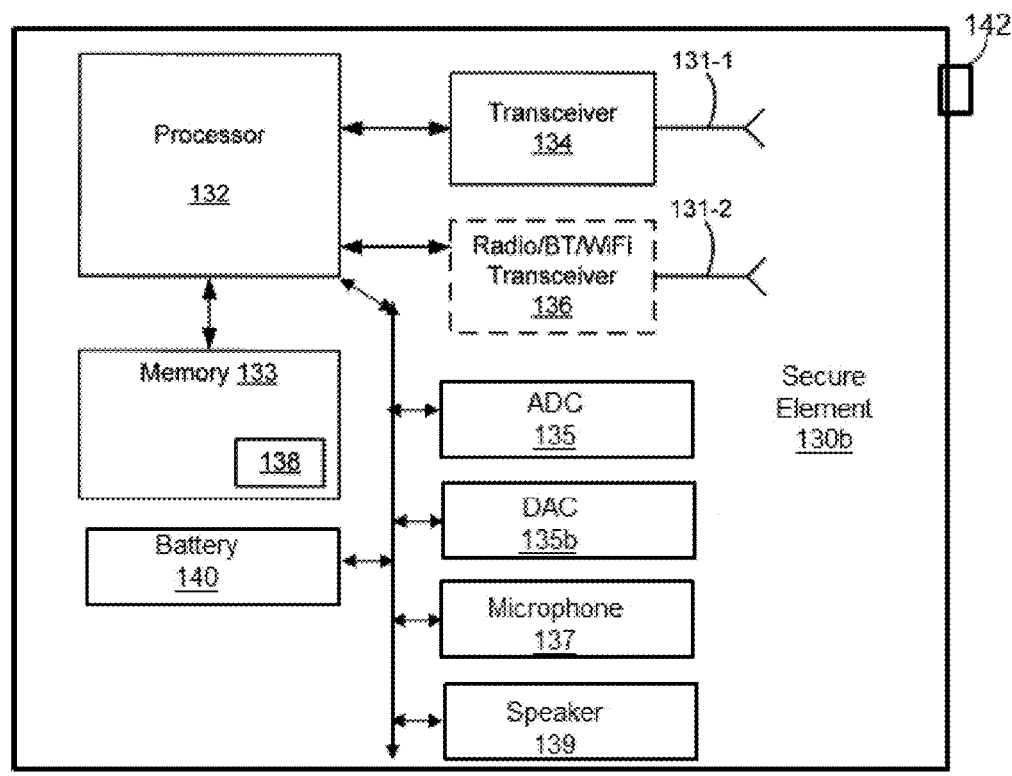

In some embodiments, the secure element 130*a* includes a second microphone (137), a second speaker (139), a second analog to digital converter (135), a second digital to analog converter (135*b*), and a second battery as shown in FIG. 3*b*. These components are adapted to communicate wirelessly with the mobile communication device 110 (e.g., via the microphone 118 and/or speaker 117 (FIG. 2) in the mobile communication device 110).

The memory 133 stores one or more applications, including one or more e-commerce applications (e.g., applications 720, FIG. 7), to be executed by the processor 132. Associated with respective e-commerce applications are respective application programming interfaces (APIs) for interacting with corresponding applications run on the processor 123 in the mobile communication device 110 (FIG. 2) and with POS or POE terminals 150 (FIG. 1). Examples of such interactions are provided below with respect to FIGS. 4A-4D. It should be important to note that the applications API's 724 that interact with the POS and POE are different than the application API's 722 that interact with the mobile communication device or remote servers. The application API's 724 that interact with the POS and POE are designed to respond to a near field communication induction signal. The application API's 724 are executed in response to the near field communication signal from a remote POS and/or POE.

In some embodiments, the secure element 130, while physically coupled to the mobile communication device 110, is not electrically coupled to the device 110 and does not receive power from the device 110. Instead, for example, the secure element 130*a* receives RF power from a remote terminal (e.g., a POS or POE terminal 150) resulting from induction when in proximity to the remote terminal and uses this power to operate the processor 132, memory 133, and transceivers 134 and 136. In this scenario, the secure element can be embedded in the cell phone case which is affixed to the mobile communication device 110 and still not be electrically coupled to the mobile communication device.

In some embodiments, the secure element 130 is electronically coupled to the mobile communication devices and receives its power indirectly from the battery 128 within the mobile communication device. This is accomplished when the mobile wallet application which resides on the mobile communication sends an audio signal and thereby creating an electronic current over the cable 141 connected to the secure element which triggers induction and activates the secure element 130. In this scenario, if the secure element embedded in the cell phone case it can also be electrically coupled to the mobile communication device 110 through the analog cable 141 connecting the secure element to the mobile communication device analog port 121, for example. The secure element 130 can also be electrically coupled though the data port of the mobile communication device.

In the absence of another power source, the secure element 130*a* thus communicates with the mobile communication device 110 only when receiving power from a remote terminal. In some embodiments, a secure element 130*b* includes the components of the secure element 130*a* and also includes a battery 140, as shown in FIG. 3B. The battery can be charged using conventional methods such as an AC charger, solar charger, etc. Alternatively, the battery 140 is charged inductively (e.g., using a power harvester such as the power mat), which allows the battery 140 to be encased within the housing or body of the secure element 130*b*. In some embodiments, the battery 140 is surrounded by or encased in RF shielding to prevent interference between the battery 140 and the transceiver 134 or transceiver 136, in the secure element 130. In other embodiments the antennae is encased in RF shielding. In an alternative embodiment a thin RF shield is placed between the battery 140 and the transceiver 134 or transceiver 136 to prevent interference. The secure element 130*b* also may include one or more light-emitting diodes (LEDs) 142 to indicate a charge status of the battery 140.

Figure 3C:
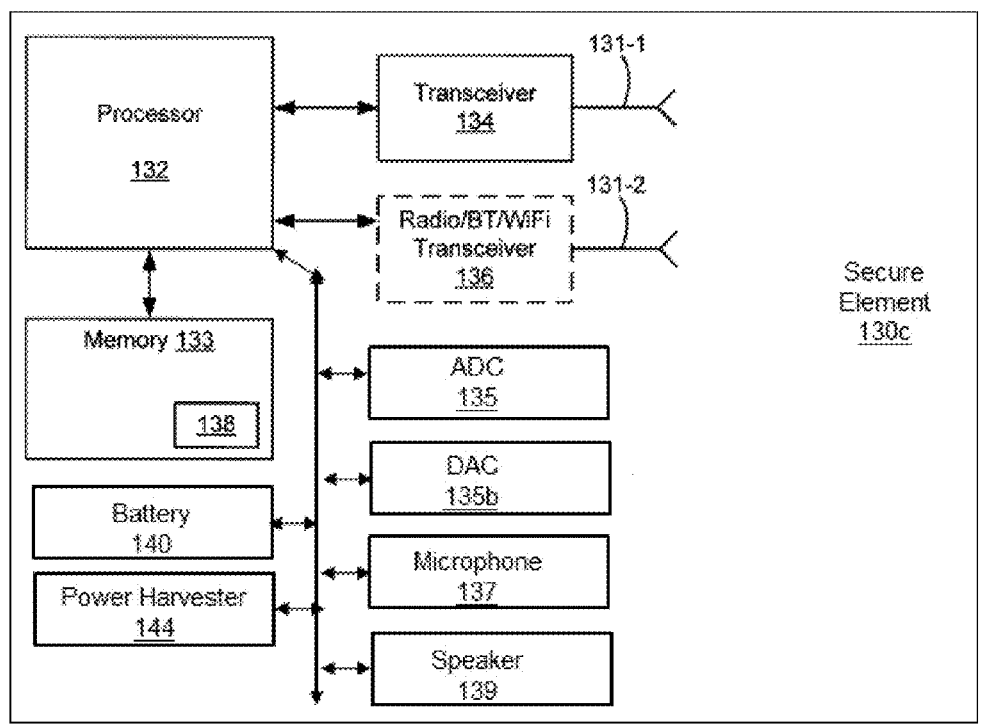
Figure 3C:
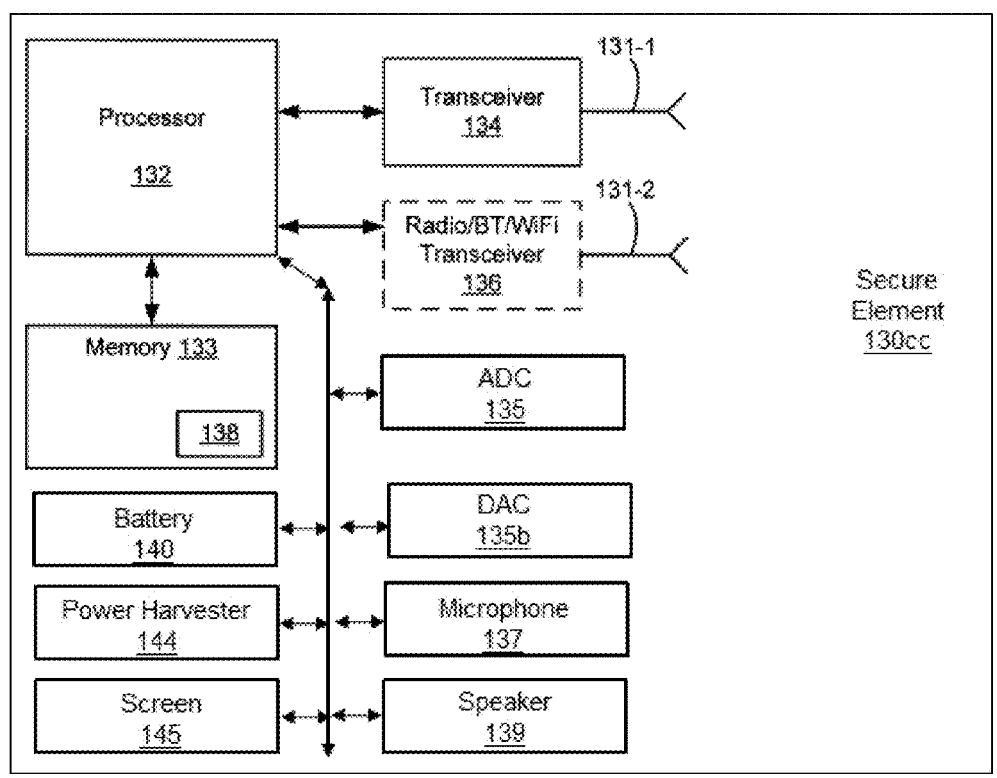

In other embodiments, a secure element 130*c* includes the components of the secure element 130*a* and also includes power harvesting circuitry 144, as shown in FIG. 3C. The power harvesting circuitry 144 harvests power from ambient radio-frequency (RF) signals from the mobile device battery or external sources around the mobile device and uses the harvested power to power the battery 140 other components of the secure element 130*b*. The power harvesting circuitry 144 can also harvest power generated during the near field communication interaction between the secure element and a remote POS or POE device. Thus, every time a user uses their NFC enabled mobile device with associated secure element for a NFC transaction, the power harvester utilizes the power to recharge the battery inside the secure element. In some embodiments, a secure element 130 includes both a battery 140 and power harvesting circuitry 144; the power harvesting circuitry 144 is used to recharge the battery. In FIGS. 3B and 3C, the power bussing between the battery 140 (FIG. 3B) or power harvesting circuitry 144 (FIG. 3C) and other components is not shown, for visual clarity.

In some embodiments, the components of the secure element 130*a* are implemented on a single integrated circuit (IC); this single integrated circuit is sometimes referred to as a smart chip. The smart chip and any other components (e.g., the battery 140, FIG. 3B, or power harvesting circuitry 144, FIG. 3C) of the secure element 130 are encased within a card, referred to as a smart card, that serves as a housing of the secure element 130. In some embodiments, the smart card is adhesively affixed to the mobile communication device 110 and is referred to as a sticker.

Figure 3D:
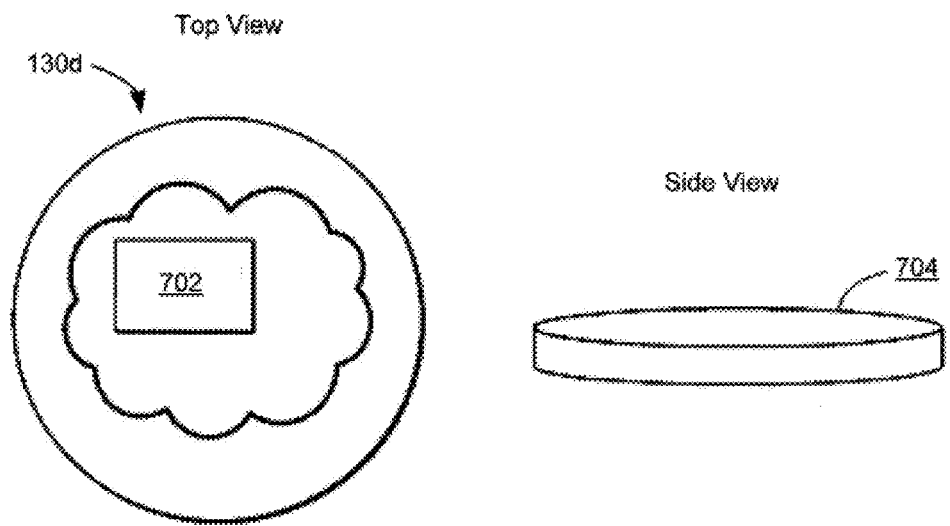
FIG. 3D illustrates top and side views of a smart card that can be attached externally to a mobile communication device in accordance with some embodiments.

FIG. 3D illustrates top and side views of a smart card 130*d*, which is an example of a secure element 130 (FIG. 1). The smart card 130*d* can be attached (e.g., affixed) externally to a mobile communication device 110. In FIG. 3D, the smart card 130*d* has a circular shape. The smart card 130*d* can have other suitable shapes (e.g., rectangular, triangular, and so on). The smart card 130*d* includes an embedded smart chip 702 that includes the components of the secure element 130*a* (FIG. 3A). The smart chip 702 is capable of 2-way wireless communication with a remote terminal (e.g., a POS or POE terminal 150) and with the mobile communication device 110 using the transceivers 134 or 136.

In some embodiments, the transceivers 134 and/or 136 in the smart chip 702 are low-power RF transceivers. Their low power output makes them susceptible to RF interference from neighboring devices, such as the mobile communication device 110 to which the smart card 130*d* is attached. Thus, in some implementations, the smart card 130*d* includes an RF shield to insulate the smart chip 702 from external interference. In one implementation, a lining of the smart chip 702 is composed of an RF absorbent material. In general, each phone has different levels of interference, and a material, size and thickness of the RF lining can determine an effectiveness of the RF shield. Alternatively, instead of incorporating an RF shield within the smart card 130*d*, an RF shield can be placed between the smart card 130*d* and the mobile communication device 110.

Given the abuse a mobile communication device 110 can take, smart cards 130*d* that are attached externally to a mobile communication device are designed to withstand some abuse. In some embodiments, the smart card 130*d* includes a ruggedized shell 704 that encases the smart chip 702. In some implementations, the shell 704 is formed of a composite plastic or polymer. The shell 70 can be hard (and substantially inflexible) or soft (and pliable). In some implementations, the shell 704 includes a protective membrane for the smart chip 702 which prevents damage to internal circuitry of the smart chip 702, a surface to adhere to an RF lining and/or the mobile communication device 110 with appropriate adhesive, and a surface that faces outward when the smart card 130*d* is attached to the mobile communication device 110, on which to print branding and advertising. Types of adhesives that can be used to affix the smart card 130*d* to the mobile communication device 110 include, for example, paper glue, super glue, adhesive polymers, and the like. In one implementation, the shell 704 has a maximum width (or diameter) of 25 mm, and has a maximum thickness (or depth) of 5 mm.

In some embodiments the shell can include a small screen 145 to show images stored in the secure element memory 133. The screen 145 is depicted in FIG. 3CC. It is mounted to a controller board and displays images that are stored in the secure element memory 133. The mini screen 145 may be based on a Liquid Crystal Display (LCD). LCD can be a passive monochrome display such as a Super-Twisted Nematic display (STN), a passive color Super-Twisted Nematic display (CSTN), or an active color Twisted Nematic (TN). The LCD's vary in terms of power consumption, image quality, and response time. For example, while an STN requires less power than the TN, it has lower image quality and slower response time.

In a preferred embodiment, the screen 145 is based on a an Organic Light-Emitting Diode (OLED) which converts electricity to light. It does not require power when its inactive which makes it great for the secure element when it's not in use. Therefore, the screen 145 may not display any image when the secure element is not in use or in passive mode. Also, when it does use power, it uses power more efficiently than LCD. In fact, an OLED may only utilize 60-80% of the power of an LCD.

The images can be preinstalled in the memory, downloaded directly to the secure element 133 from a remote server, or downloaded to the mobile device and then transferred to the secure element memory 133. The images can be one or more logos representing financial institutions (e.g. Visa, MasterCard, American Express, Bank Of America, Citbank, etc) that have payment credentials stored in the secure element. Thus, the images serve as a branding opportunity for financial institutions. The images can change automatically based on which payment credential is active at any given time. For example, if the user elects to use their American Express card, the image will change automatically to be the American Express logo. The image will change if the user elects to use a different payment method. The user uses the mobile wallet to select which payment card they want to use. Upon doing so, using techniques described in previous patents referenced herein, the mobile wallet sends a notification to the secure element controller which executes the appropriate secure element application to change the status of the appropriate secure element payment application to active as well as changes the status of the corresponding image to active The images can be treated as advertisements and so the advertiser who pays for placement for a given time period will be able to display the image of their choice. Advertisers can bid on placement of images on the secure element screen 145. The highest bidder will be able to display the image of their choice on the screen 145.

Images can be displayed based on the users geographic location utilizing the GPS function built into the mobile communication device, prior shopping history, gender, interests, and other attributes as previously described in U.S. patent application Ser. No. 11/944,267, entitled "Method and System for Delivering Information to a mobile communication device based on consumer transactions", filed Nov. 21, 2007.

Users may elect to display a generic image that has no branding, Alternative, they may elect to display an image of their favorite sports team, celebrity, alumni, children, etc. The mobile wallet enables a user to select which image they want to display on the screen 145. The user can also purchase an image from a remote server and download it to the mobile device which then transfers it to the secure element memory for display on the screen 145. In some cases the image can be downloaded directly to the secure element 130 from a remote server or the user can receive an image from another user who has an NFC enabled device through a peer-to-peer transfer using NFC as described in previous patent applications referenced herein. If a user does not select an image and there are no advertisements, the secure element displays a default image on the screen 145. If the secure element is embedded in a cell phone case, the image is displayed through the case if the cell phone case is clear or through a window/opening in the cell phone case.

The screen 145 may show 1 or more images and size them appropriately. For example, if there is only 1 image, the secure element will automatically display the image in the center of the screen. In another example if there are 2 images, the secure element will display the images in the center of the screen such that they are positioned side by side next to each other or stacked vertically on top of each other. The API in the secure element will determine how to dynamically rotate the image, /resize them to fit the screen, and placement location on the screen.

Figure 3E:
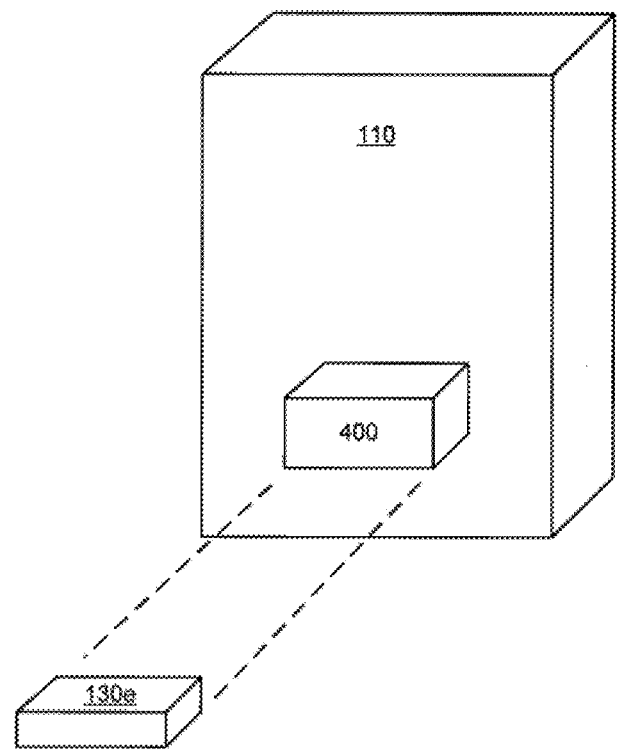
FIG. 3E illustrates a mobile communication device with a slot for receiving a secure element in accordance with some embodiments.

In some embodiments, instead of being externally attached to the mobile communication device 110, a secure element 130 is physically coupled to the mobile communication device 110 by being disposed internally within a body of the mobile communication device 110. For example, as shown in FIG. 3E in accordance with some embodiments, the mobile communication device 110 includes a slot 400 into which a secure element 130*e* is inserted. The secure element 130*e* is an example of a secure element 130*a*, 130*b*, or 130*c* (FIGS. 3A-3C). Even though the secure element 130*e* is physically housed within the slot 400, the secure element 130*e* and the mobile communication device 110 still communicate wirelessly with each other. Accordingly, in some implementations the slot 400 only provides for physical insertion and mechanical connection of the secure element 130*e* to the body of the mobile communication device 110, and does not electrically couple the secure element 130e to the mobile communication device 110.

Figure 3F:
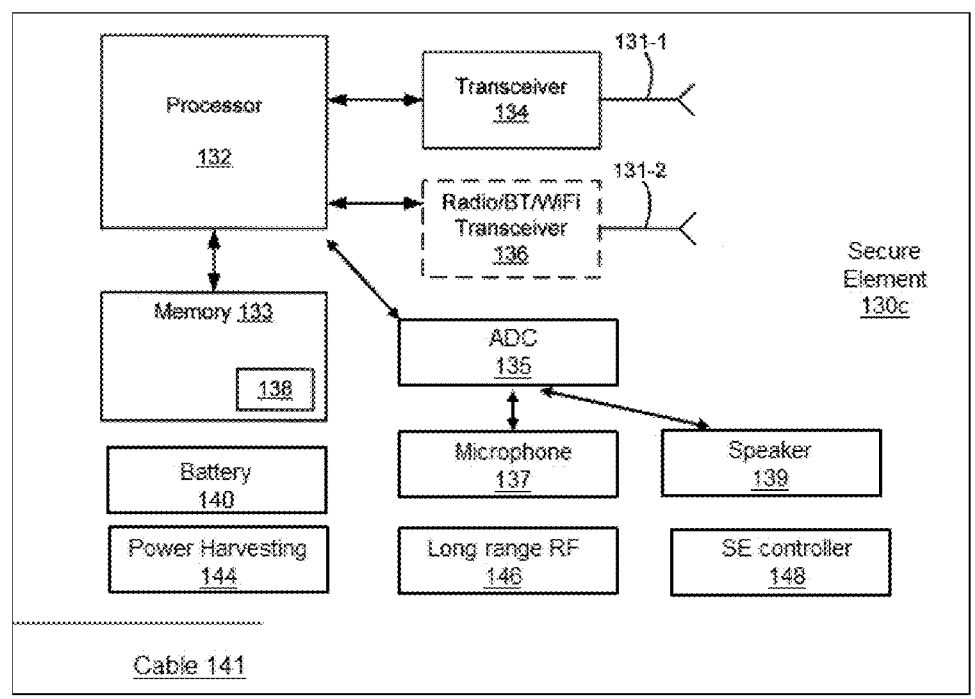
FIG. 3F illustrates a secure element with Secure element controller

FIG. 3F shows a modified secure element 130 that is capable of bi-directional communication with a mobile device has a secure NFC processor 132, a secure memory 133 and a POS/NFC transceiver 134 adapted to send transaction request signals and receive transaction response signals over a first communication channel. A/D converter 135, a microphone 137, a speaker 139, and a, cable 141, power harvester, 144, Long range RF transceiver, 146, and a SE controller, 148. The Secure Element Controller 148 can either be logical or physical. In a logical implementation, it simply utilizes the primary secure element transceiver 134, memory 133 with data and applications, and a processor 132 to communicate with multiple logical or physical secure elements. Stated another way, the Secure Element Controller is the parent controller and all of the other logical or physical secure elements. The Secure Element Controller can issue read/write commands to all of the other logical or physical secure elements.

Figure 3G:
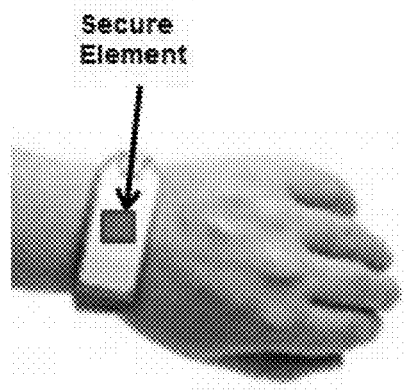
FIG. 3G illustrates a secure element embedded in a wristband
Figure 3H:
FIG. 3H illustrates a secure element embedded in an ID card

FIG. 3G illustrates a secure element that is capable of either two-way communication or one-way communication with a POS/POE device that is not affixed to a mobile device nor electrically coupled to the mobile device. Instead the secure element is affixed to a plastic ID card. FIG. 3G illustrates a secure element that is affixed to hospital bracelet. The secure elements in FIG. 3G may not include a processor that is capable of bidirectional communications, but instead is a passive device 138' as depicted in FIG. 3H, such as an RFID sticker or some other tag, that allows for user identification. Similarly, other secure elements that are not affixed to a mobile device nor electrically coupled to a mobile device can be incorporated with a key chain, watch, ring, bracelet worn as jewelry just to name a few. These secure elements can also include a processor that is capable of bidirectional communications with a POS/POE/POP or be similar to a passive secure element device 138' as depicted in FIG. 3H, such as an RFID sticker or some other tag, that allows for user identification.

Figure 3I:
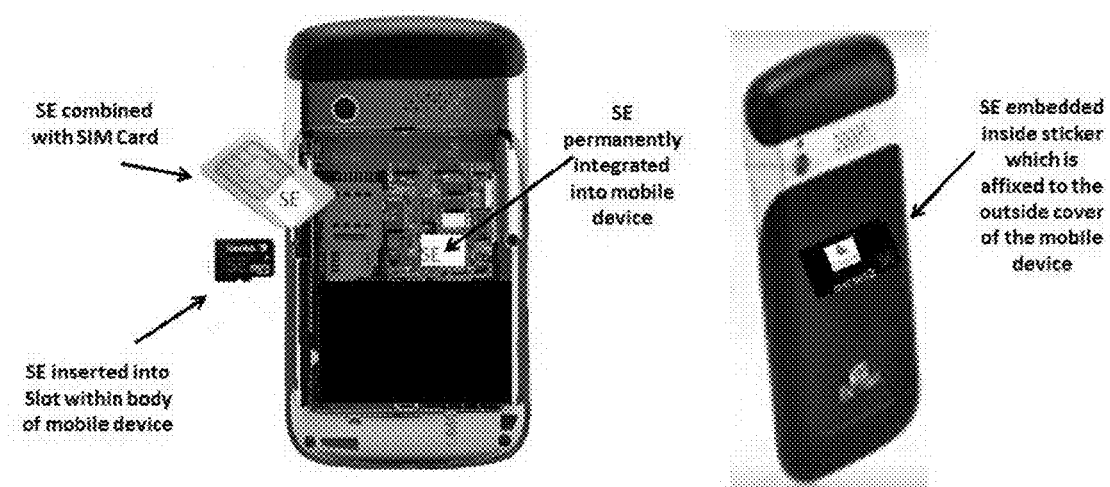
FIG. 3I illustrates an NFC enabled mobile device with multiple secure element according to one implementation

FIG. 3I illustrates an NFC enabled mobile device with multiple secure element according to one implementation Attention is now directed to methods of communication between various elements of the system 100 (FIG. 1), including the mobile communication device 110 and the secure element 130. Data is transmitted between the mobile communication device 110 and the secure element 130 using inaudible sound waves in one of several ways.

Figure 8:
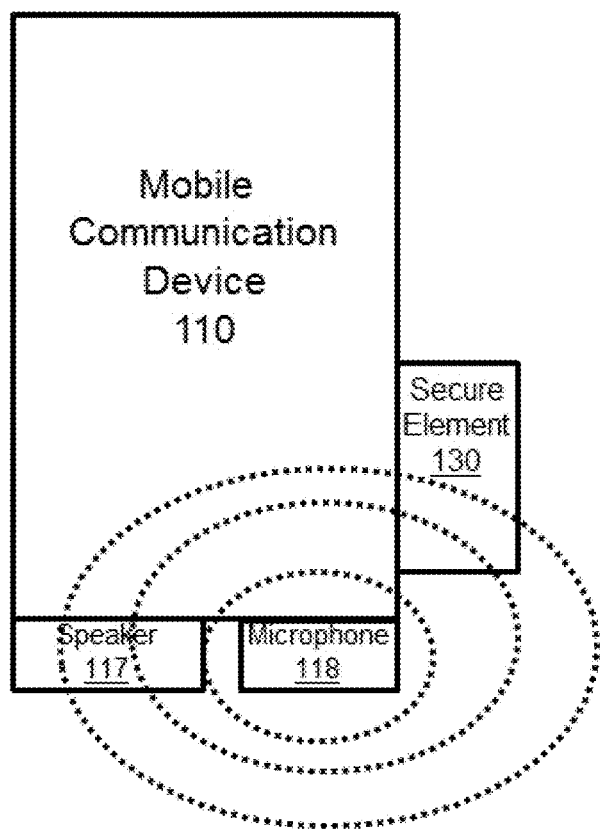
FIG. 8 is a diagram depicting diffracted sound waves emanating from microphone inside the mobile communication device

In a first embodiment, the secure element includes a miniature speaker and microphone. For example, the speaker may be is about 0.476 centimeters or wide enough such that when the sound waves travel through the speaker opening, they bend or diffract spreading out at least 2½ inches which will enable the sound waves to reach the microphone in the mobile communication device. The speaker in the mobile communication device may also be the same width and benefit from diffraction to such that the sound waves that traverse through its opening can spread to the microphone in the secure element. During transmission, the signal is diffused or bent in radial circumference that is ratio of the wavelength (lambda or λ) and the width of the speaker in the secure element as shown in FIG. 8. The wavelength is the ratio of the velocity of the transmission and the frequency of the transmission. For example, since the velocity of sound through air is 340 m/s and the inaudible sound wave is 10 Mhz, the wavelength is 0.034 meters or 3.4 centimeters. Diffraction is wavelength or 3.4 centimeters divided by the width of the speaker opening which is designed to be 0.476 CM. So, diffraction is approximately 7.14 centimeters or almost 4 inches which is sufficient distance to transmit the inaudible sound wave between the mobile communication device 110 and the secure element 130.

Figure 9:
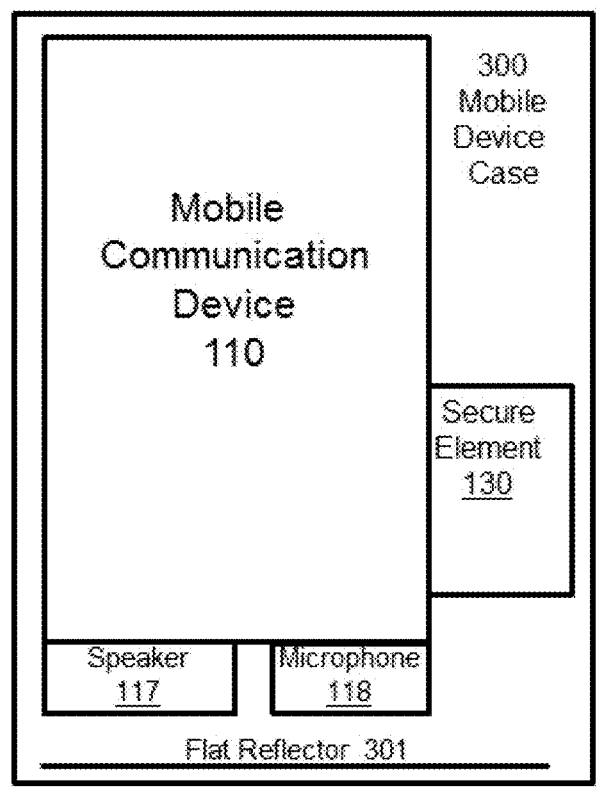
FIG. 9 is a diagram depicting a flat shaped reflector located inside the mobile communication device case.
Figure 10:
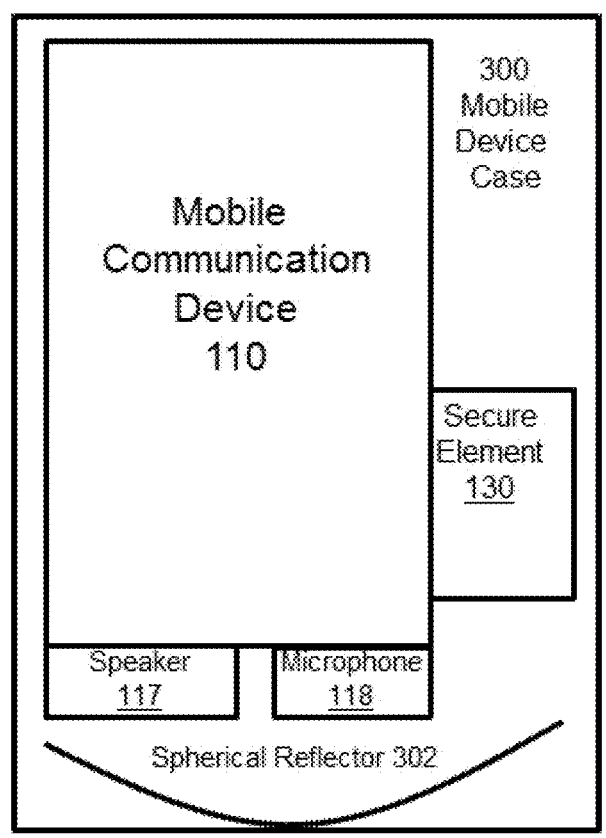
FIG. 10 is a diagram depicting a spherical shaped reflector located inside the mobile communication device case.
Figure 11:
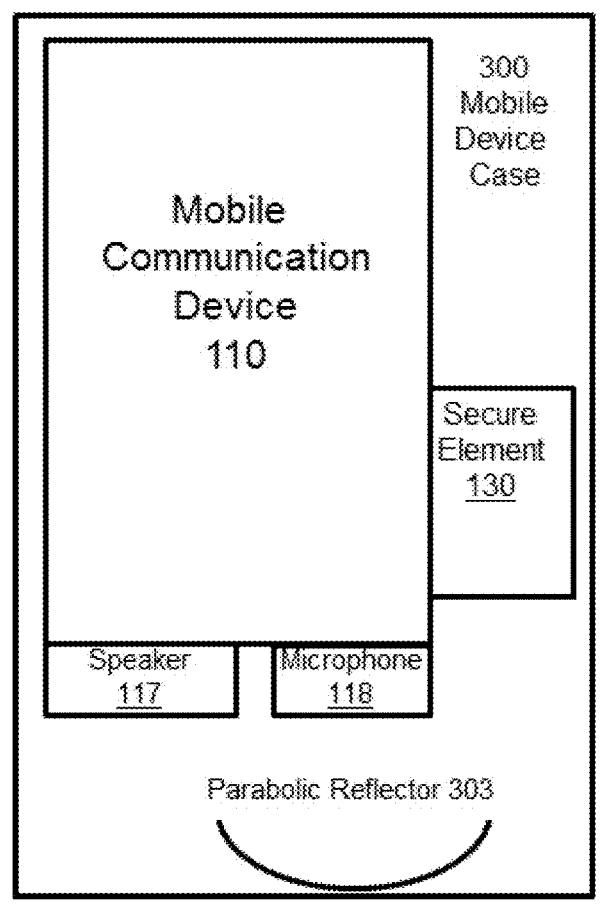
FIG. 11 is a diagram depicting a parabolic shaped reflector located inside the mobile communication device case.

In another embodiment as shown in FIG. 9, inaudible sound waves can be reflected off a flat surface and directed to another surface. So, for example if a mobile device is housed inside a case 300 or the mobile device case 300 is affixed to a mobile device, the mobile device case may include a flat reflector 301 located at the bottom of the case 300. When the inaudible sound wave is transmitted from the microphone 118 in the mobile device 110, it is reflected off the reflector 301 so that it is directed at the speaker 139 located in the secure element 130. The reverse process is true as well. An inaudible sound wave leaving the microphone 137 in the secure element 130 can be reflected off the reflector 301 such that it is directed towards the speaker 117 located in the mobile communication device 110. The angle of impendence of the inaudible sound wave is equal to the angle in which the sound wave leaves the origination. For example, if the inaudible sound wave leaves the microphone 137 in the secure element 130 at 45 degrees, it will reflect off the reflector 301 and contact the speaker 117 in the mobile communication device 110 at 45 degrees. The reflector 301 can be made of polyglass or another suitable reflective material. The reflector may be covered with a temporary strip to protect it during shipment. A flat reflector lends itself well to a mobile device case 300 that snuggly fits mobile device In another embodiment, the mobile device case 300 may include a spherical reflector 302 as depicted in FIG. 10 or parabolic 303 reflector ad depicted in FIG. 11. In either of these scenarios, the mobile device case 300 is loose fitting and has enough space to accommodate a spherical reflector. Alternatively, the secure element and the reflector may be pre-installed and embedded in the mobile device case 300 The benefit of a spherical 302 or parabolic reflector 303 is that the sound wave can be focused to a specific single point which makes the transmission of the data more accurate and less prone to error. Stated another way, the inaudible signal transmitted from the microphone 137 located in the secure element 130 to can be sent directly to the speaker in the mobile device 117. Also, the inaudible signal transmitted from the microphone in the mobile device 118 can be sent directly to the speaker 139 in the secure element 130. Either reflector can be made of polyglass or another suitable reflective material. As indicated above the reflector may be covered with a temporary strip to protect it during shipment.

It should be appreciated that the reflector can be any suitable size, shape, or material.

Alternatively, the inaudible sound wave can be reflected off a reflector located on a computer monitor, keyboard, laptop, ebook, a business card, or any other suitable medium. In this case, the user points the mobile communication device and externally affixed secure element in the direction of the reflector similar to pointing a remote control at a television.

Instead of using sound waves, the preceding embodiments can also utilize light waves to transmit the data between the mobile communication device 110 and the secure element 130. The angle of refraction is a function of the angle of incidence and the index of refraction for the material associated with the reflector in accordance with Snells law. For example, the index of refraction for plexi glass is 1.5. The appropriate parameters for calculating the angle of incidence and the index of refraction may be preinstalled in the secure element or downloaded to the secure element or the mobile communication device.

For security purposes, distance in which the inaudible signal travels between the mobile device and/or secure element can be minimized. Since distance is speed divided by time, and the speed of sound is roughly 340 meters per second, the distance can be limited by restriction the time transmission of the signal. For small mobile devices such as the Nokia 3220, the distance between the mobile communication device and the secure element affixed to the mobile communication device may be 1 inch or less for example. For medium sized phones such as an iPhone, the distance between the mobile communication device and the secure element affixed to the mobile communication device may be 2 inches or less for example. For large sized phones such as an Android or Sidekick, the distance between the mobile communication device and the secure element affixed to the mobile communication device may be 3 inches or less for example. An API in the secure element and the mobile communication device will determine the appropriate distance based on the mobile communication device make and model.

As an alternatives security precaution the mobile communication device and or the secure element can estimate the distance of the signal. If the distance is greater than the expected amount, the mobile communication device and/or the secure element can reject the signal since the distance may indicate the signal is from an unauthorized or rouge device. For example, if the distance is greater than 2 inches, the mobile communication device and or the secure element may reject the signal. For example, the mobile communication device can send a signal to the secure element with an initial time stamp, T1. The mobile communication device waits for a response from the secure element. When it receives it at time stamp, T2, the mobile communication device can compute the time it took to receive the signal which is T2−T1. The mobile communication device can then estimate the distance of the secure element by dividing the speed of sound of 340 meters per second by the time difference of T2 minus T1. If the distance is greater than expected (e.g. 1 inch, 2 inches, or 3 inches), than signal may indicate that it was originated by a rogue or unauthorized device and the mobile communication device may not process the signal.

In addition to this the inaudible sound waves may also include a unique tone or series of unique tones similar to a digital watermark in a photo to prevent rogue signals from being sent.

Thus, the mobile communication device and/or secure element may perform multifactor authentication which includes the PIN, signal distance or audio watermark, etc.

FIGS. 4A through 4D illustrate examples of transactions involving the mobile communication device 110, the secure element 130, and other elements of the system 100.

Figure 4A:
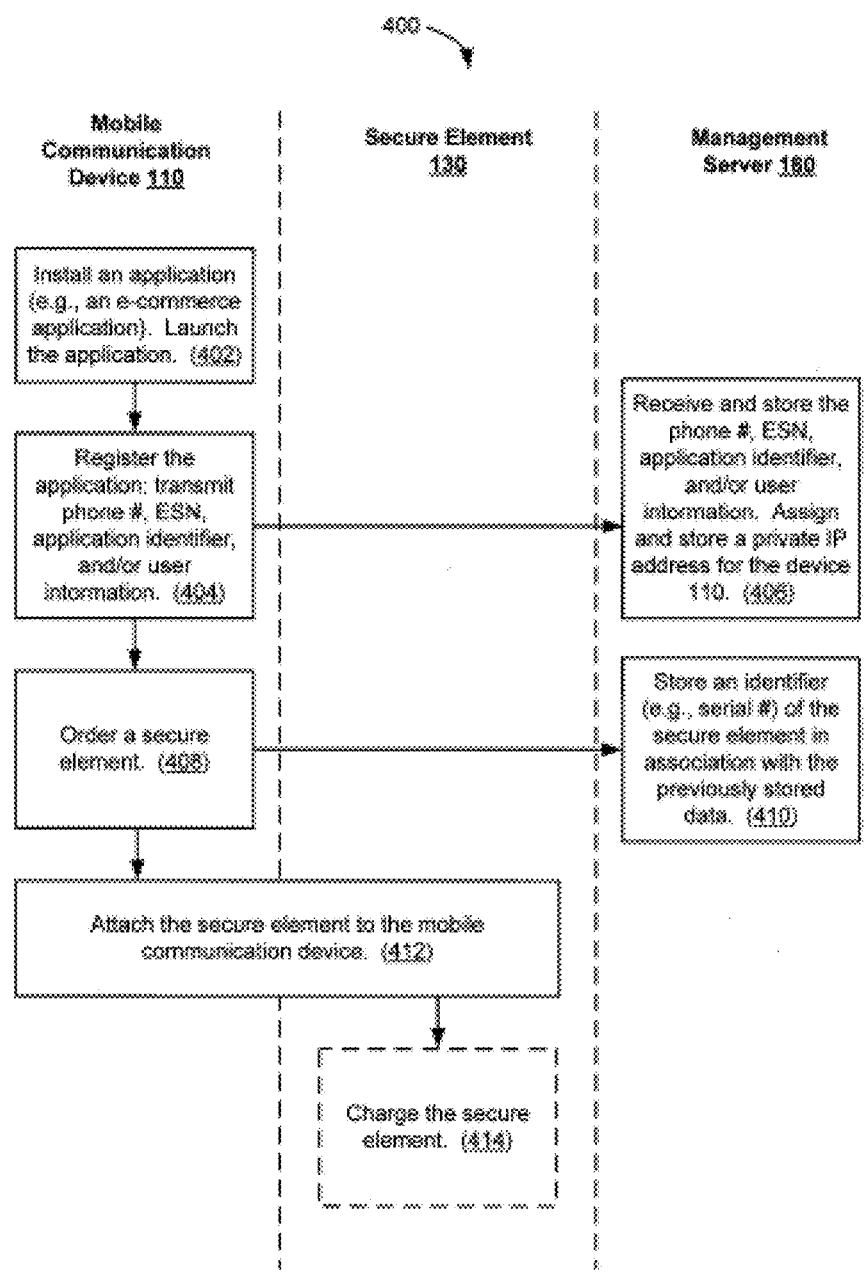
FIG. 4A is a flow diagram illustrating a method of installing a secure element in accordance with some embodiments.

Various operations shown in FIGS. 4A-4D, including operations 430 (FIG. 4B), 452 (FIG. 4C), 468 (FIG. 4D), and 476 (FIG. 4D), involving sending messages from the secure element 130 to the mobile communication device 110. FIG. 4A is a flow diagram illustrating a method 400 of installing a secure element 130 in accordance with some embodiments. In the method 400, an application (e.g., an application 620, such as an e-commerce application 622, FIG. 6) is installed (402) on the mobile communication device 110 by storing the application in the memory 126 (FIG. 2). The application is launched (402), thus initiating execution of the application by the processor 123 (FIG. 2). The user of the application registers (404) the application: in response to an instruction to register the application, the application transmits to the management server 180 (FIG. 1) the phone number and electronic serial number (ESN) of the mobile communication device 110, along with an identifier of the application and/or user information. This information is transmitted, for example, in one or more packets addressed to the management server 180, as created by the processor 123 and transmitted via the transceiver 122 or 129 (FIG. 2). The management server 180 receives and stores (406) this information. In some embodiments, the management server 180 also assigns a wavelength for the mobile device ADC converter and polling interval for the secure element 130. The user orders (408) a secure element 130. The order is placed, for example, using the application. The management server 180 stores (410) an identifier of the secure element 130 to be provided to the user. For example, the management server 180 stores (410) a serial number of a smart chip 702 (FIG. 3D) in a smart card 130d to be provided to the user. Alternatively, the user obtains the secure element 130 and enters a code printed on the secure element 130 into the application, which transmits the code to the management server 180, where it is stored. The management server 180 uses the registration information to look up information about the mobile device (e.g., microphone width).

Figure 4B:
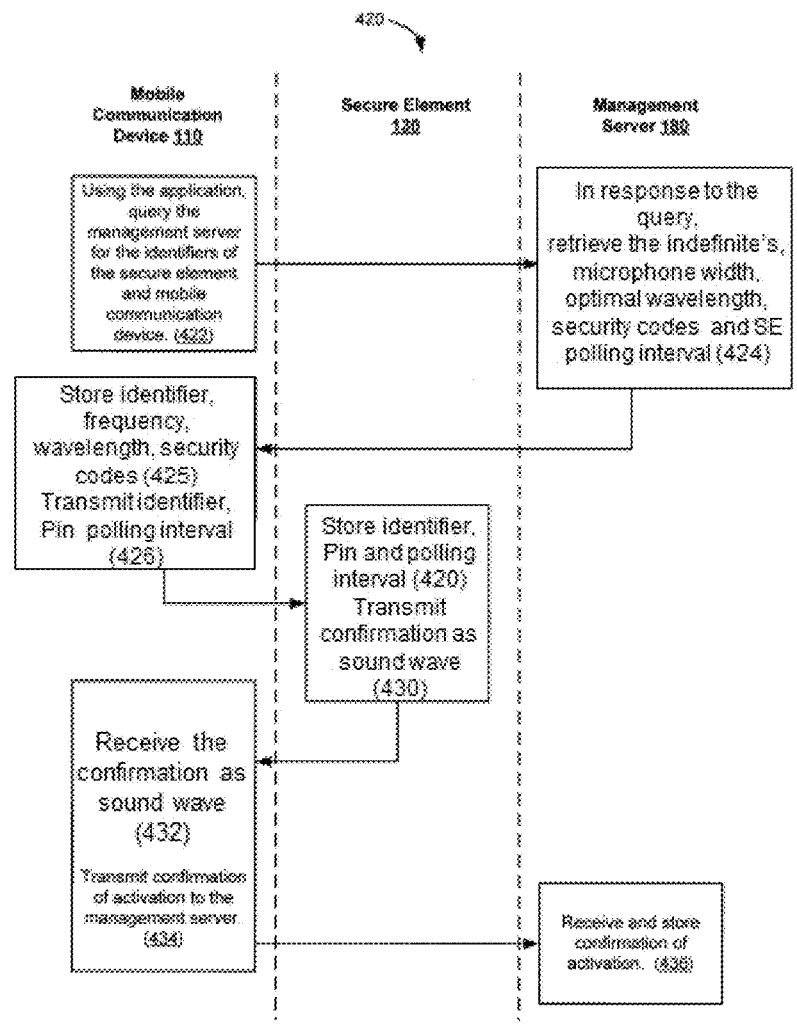
FIG. 4B is a flow diagram illustrating a method of activating a secure element in accordance with some embodiments.

Upon receiving the secure element 130, the user attaches (412) the secure element 130 to the mobile communication device 110. The secure element 130 should be placed so that the microphone 137 and speaker 139 in the secure element 130 are closest to the edge of the device 110 and facing in the direction of the microphone 118 and speaker 117 of the mobile communication device 110 for optimal performance. For example, the user adhesively affixes a smart card 130d (FIG. 3D) to the mobile communication device 110. In another example, the user inserts a secure element 130e (FIG. 3E) into a slot 400 in the mobile communication device 110. The secure element 130 may also be embedded in the mobile communication d device case 130 so the case should be affixed to the mobile communication device in such a way that the microphone 137 and the speaker 139 located inside the secure element 130 are pointing in the direction and are closest to the mobile communication device microphone 188 and speaker 117. If the secure element 130 includes a battery 140 (FIG. 3B), the battery 140, and thus the secure element 130, is charged (414). After the secure element 130 has been installed in accordance with the method 400, the secure element 130 is activated. FIG. 4B is a flow diagram illustrating a method 420 of activating a secure element 130 in accordance with some embodiments. In the method 420, the user uses the application running on the processor 123 (FIG. 2) to query (422) the management server 180 for the identifier of the secure element 130 and, in some embodiments, the mobile communication device 110.

In cases where diffraction is used to transmit the inaudible sound wave between the secure element and the mobile communication device, the management server 180 will identify the width of the speaker and microphone installed inside the mobile communication device and calculate the optimal wavelength and inaudible sound frequency (e.g. 10 Mhz) to ensures maximum diffraction or bending of the sound wave that emanates from the speaker 119 in the mobile communication device 110. The management server will also determine polling interval for secure element 130 to poll the mobile communication device for e commerce data. The management server will also look up the set of security codes indexed by a transaction counter that correspond to the secure element. In response, the management server 180 retrieves the stored identifier(s), security codes, recommended polling interval for the secure element 130, and recommended sound wave frequency for the speaker 119 in the mobile communication device and transmits (424) the identifier(s) and other information to the mobile communication device 110. The mobile communication device 110 stores (425) the optimal wave length, frequency, pin, identifier, and polling interval. The mobile communication device 110 turns on the internal microphone 118 and speaker 117. The mobile communication device 110 activates the microphone 137 in the secure element 130 by using the transceiver 122/129 to establish a point-to-point connection with the transceiver 134/135 in the secure element 130. After the connection is established, the mobile communication device formulates a packet with a message for the secure element to turn on the internal microphone 137. The mobile communication device transmits (426) the identifier for the secure element, polling interval, and pin to the secure element 130. The secure element receives the information (420) and stores it in its memory. The secure element creates an inaudible sound wave with a message confirming receipt of information and transmits confirmation (430) to the device 110. The device 110 receives confirmation (432) and sends a copy to the management server (434). The API in the device 110 turns off the internal microphone 118 and speaker 117.

In cases where diffusion is not used, but reflection is used to transmit the inaudible sound waves between the secure element and the mobile device, as described above, the management server will determine if the reflector is flat, spherical, or parabolic. If its flat, then the angle of incidence of the wave is equal to the angle of the wave is transmitted at.

Figure 4C:
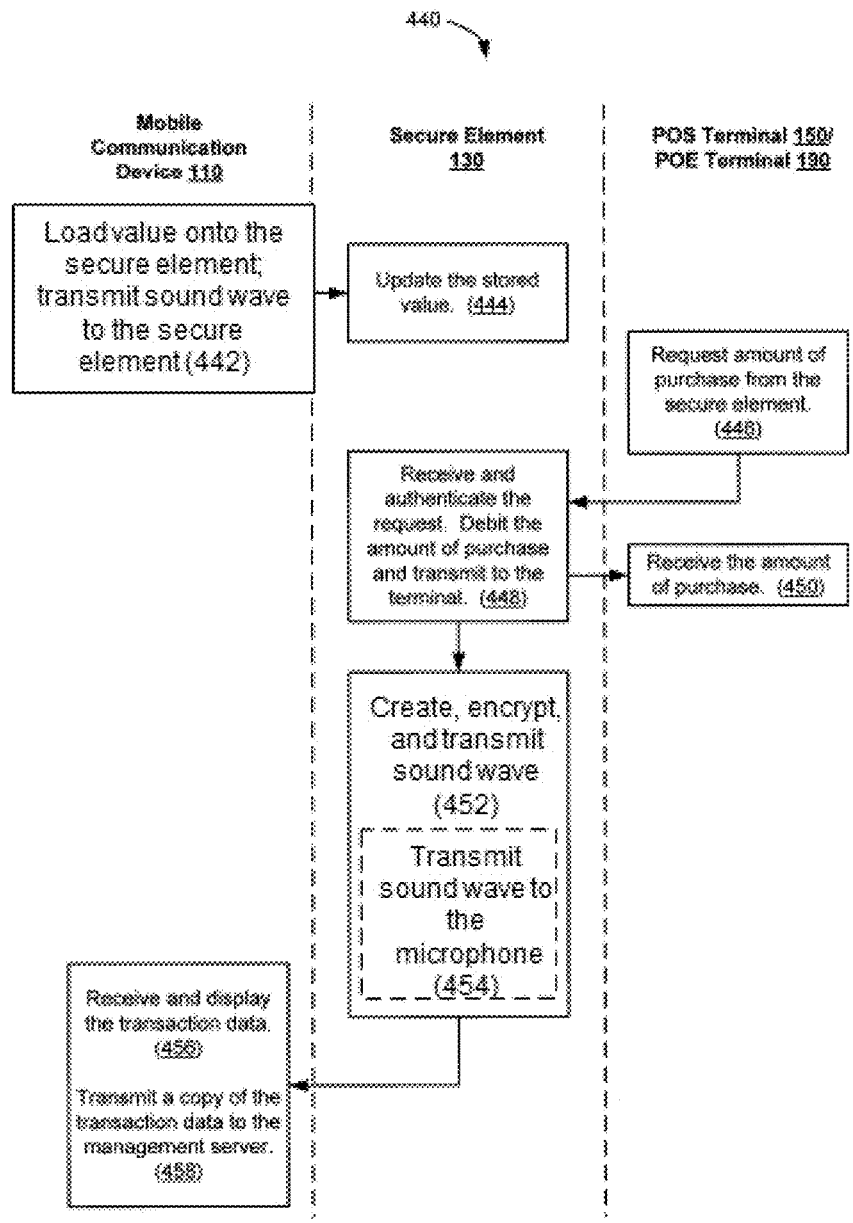
FIG. 4C is a flow diagram illustrating a method of using a secure element for a purchase in accordance with some embodiments.

Once the secure element 130 has been activated and its activation confirmed in accordance with the method 420, the secure element 130 may be used for purchases at terminals such as a POS or POE terminal 150 (FIG. 1). FIG. 4C is a flow diagram illustrating a method 440 of using a secure element 130 for a purchase in accordance with some embodiments.

In the method 440, the user instructs an application running on the processor 123 (FIG. 2) of the mobile communication device 110 to load (442) value (e.g., money or credits) onto the secure element 130. An application (or corresponding API) running on the processor 132 (FIGS. 3A-3C) updates (444) the stored value of the secure element 130 by the amount specified in the message. The application creates a digital message, specifying the value to be loaded onto the secure element 130, converts it to an inaudible analog sound waves at 10 MHz using ADC 119 (452), encrypts it, and transmits (454) the sound wave using the speaker 117 to the secure element via the microphone 137. The secure element 130 receives (456) the sound waves via the microphone 137 (FIGS. 3A-3C), decrypts the sound wave, converts it to digital using ADC 135, and displays the data to the user in the mobile wallet. In some embodiments, the secure element 130 transmits a confirmation message (not shown) to the mobile communication device 110. If the mobile communication device 110 does not receive the confirmation message from the secure element 130, it retransmits the sound waves as described in operation 442.

To purchase an item or gain entry to a venue or facility, the user brings the mobile communication device 110 with its attached secure element 130 into proximity with a POS or POE terminal 150. The terminal 150 requests (446) the amount of purchase (or entry) from the secure element 130. The secure element 130 receives this request directly from the terminal 150 via the transceiver 134 (or alternatively, 136). After authenticating the request, the secure element 130 debits its stored value by the requested amount and transmits (448) the requested amount to the terminal 150, which receives (450) the amount.

Leveraging the power that results from induction by holding the secure element 130 in proximity to the POS/POE, an application (or corresponding API) running on the processor 132 (FIGS. 3A-3C) of the secure element 130 turns on the microphone 137, creates (452) a digital message with transaction data for the purchase (e.g., the amount, the date and time, identification of the terminal 150, etc.), encrypts the digital message, converts the digital message to inaudible sound wave 135, and transmits the sound waves (453) by the speaker 139 (FIGS. 3A-3C) to the mobile communication device 110.

The microphone 119 in the mobile communication device 110 receives the inaudible sound waves. When it receives (454) the sound waves, it converts it to digital using ADC 119. It decrypts the message and confirms the message (455) is authentic by comparing the security code transmitted in the sound wave with the expected security code for the given transaction stored in memory on the mobile communication device 110. It displays (456) the transaction data contained in the message to the user. The device 110 transmits (457) a copy of the transaction data to the management server 180 (not shown in FIG. 4C), which stores the transaction data. The device also sends a confirmation that it received the messages to the secure element 130.

Figure 4D:
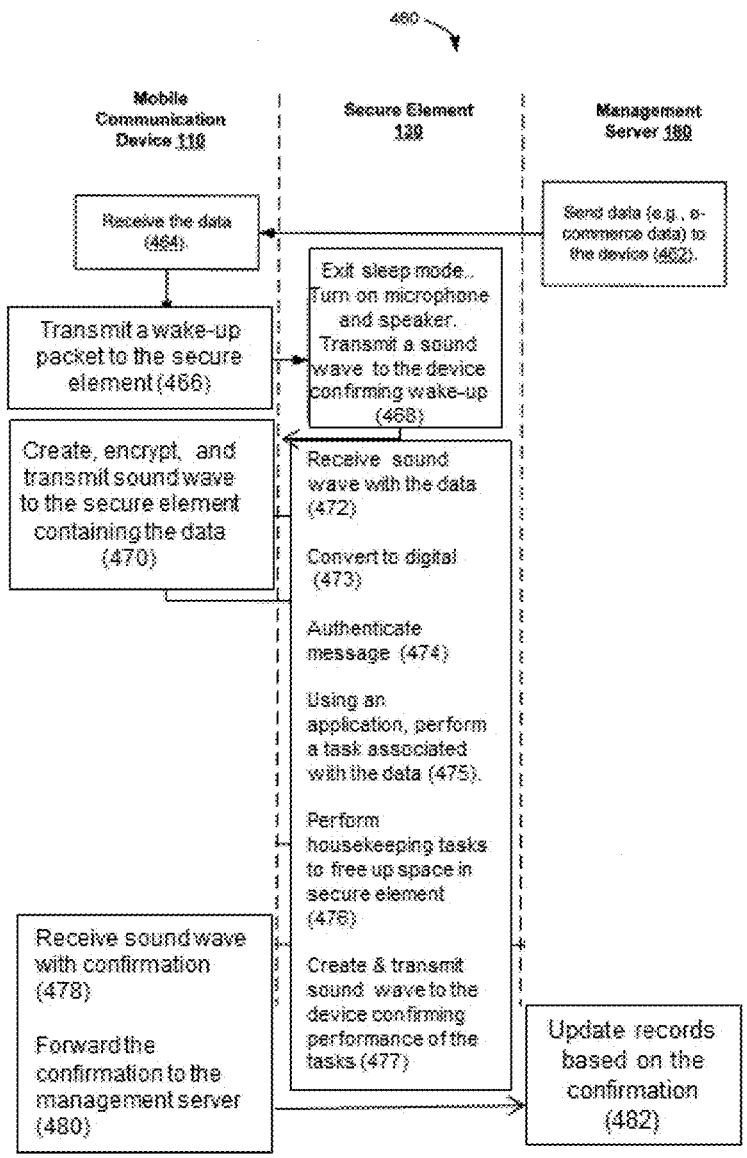
FIG. 4D is a flow diagram illustrating a method of transmitting e-commerce data to a secure element in accordance with some embodiments.

The method 440 of FIG. 4C thus illustrates a purchase performed using the device 110 and secure element 130. In some embodiments, data is provided to the secure element 130 for subsequent use or reference in a transaction such as the purchase of the method 440. FIG. 4D is a flow diagram illustrating a method 460 of providing data to a secure element 130 in accordance with some embodiments.

In the method 460, the management server 180 sends (462) data to the mobile communication device 110, which receives (464) the data. In some embodiments, the data is e-commerce data (e.g., a ticket, such as a ticket for a movie, concert, sporting event, airplane, bus, train, etc; a new value for a stored value card, credit card, or debit card; a coupon; or an advertisement). If the data includes a coupon, the coupon may include a merchant ID, promotion code, date of coupon delivery, time of coupon delivery, GPS coordinates associated with coupon delivery, etc. Other examples of the data include, but are not limited to, locations of smart posters; a code to unlock a door, computer, or vehicle; a code to start a vehicle, start a copy machine, withdraw funds from an ATM, or release medical records to a specific person or device; a list of authorized cell phone numbers, IMEI numbers, and/or serial numbers associated with secure elements for peer-to-peer funds transfer, or an instruction to disable the secure element 130 if the mobile device 110 has been reported as lost or stolen. The device 110 receives the data, for example, over a cellular network, via the transceiver 122, or over an Internet connection, via the transceiver 129. Instead of immediately forwarding the received data to the secure element 130, the device 110 first transmits (466) a wake-up packet to the secure element 130, in case the secure element 130 is in a sleep mode. The API in the mobile device 110 establishes a point-to-point connection between transceiver of the mobile communication device 122/129 (FIG. 2) to the transceiver 134/136 137 of the secure element 130. The IP address of the secure element is used to address the wake up packet.

The secure element 130 receives the wake up packet via the transceiver 134/136 (FIGS. 3A-3C) and, in response, exits sleep mode and turns on the microphone 137 and speaker 139. The processor 132 (FIGS. 3A-3C) creates a message (e.g., sound wave) confirming that the device has exited sleep mode and thus woken up. The message is transmitted (468) by the speaker 139. If the secure element 130 is locked prior to transmission, it is first unlocked remotely by the remote server or the remote server downloads the secure element key to the mobile device which then unlocks it per methods described in U.S. patent application Ser. No. 13/184,209, entitled "Method and Systems of loading and unloading digital artifacts between a mobile device with an associated secure element and other remote devices" filed on Jul. 15, 2011.

The mobile communication device 110 receives the inaudible sound wave via its microphone 118 (FIG. 2). In response, the processor 123 (FIG. 2) creates (470) sound wave containing the data received in the operation 464. The sound waves are transmitted from the speaker 117 to the secure element 130 via the microphone 137 (FIG. 2). If the secure element 130 is locked prior to transmission, it is first unlocked remotely by the remote server or the remote server downloads the secure element key to the mobile device which then unlocks it per methods described in U.S. patent application Ser. No. 13/184,209, entitled "Method and Systems of loading and unloading digital artifacts between a mobile device with an associated secure element and other remote devices" filed on Jul. 15, 2011.

In the scenario where diffusion is used to transmit the inaudible sound waves between the mobile communication device and the secure element, the secure element 130 receives (472) the inaudible sound wave containing the data via the microphone 137 (FIGS. 3A-3C) converts the sound wave from analog to a digital message 473, and decrypts the digital message. Using an application (e.g., an e-commerce application) or corresponding API running on the processor 132 (FIGS. 3A-3C), the secure element 130 authenticates the message (474) by comparing the security code received from the device 110 with the corresponding security code stored in the secure element both of which are indexed by the same transaction number. If the secure element 130 is locked prior to transmission, it is first unlocked remotely by the remote server or the remote server downloads the secure element key to the mobile device which then unlocks it per methods described in U.S. patent application Ser. No. 13/184,209, entitled "Method and Systems of loading and unloading digital artifacts between a mobile device with an associated secure element and other remote devices" filed on Jul. 15, 2011.

In an alternative embodiment the inaudible sound wave is reflected off the flat reflector 301, spherical reflector 302, or parabolic reflector located at the bottom of the mobile e communication device case 300 ad described previously. It should be appreciated that the reflector can be any suitable size, shape, or material.

Alternatively, the inaudible sound wave can be reflected off a reflector located on a computer monitor, keyboard, laptop, ebook, or even business card. In this scenario, the user points the mobile communication device at the reflector in the same way they would point a remote control at a television.

Instead of using sound waves, the preceding embodiments can also utilize light waves to transmit the data between the mobile communication device 110 and the secure element 130. The angle of refraction is a function of the angle of incidence and the index of refraction for the material associated with the reflector in accordance with Snells law. For example, the index of refraction for plexi glass is 1.5. The appropriate parameters for calculating the angle of incidence and the index of refraction may be preinstalled in the secure element or downloaded to the secure element or the mobile communication device. Using an application (e.g., an e-commerce application) or corresponding API running on the processor 132 (FIGS. 3A-3C), the secure element 130 performs (475) a task associated with the received data. For example, the data are stored in the memory 133. If the data contain an instruction to disable the secure element 130, the secure element 130 disables itself, thus preventing the secure element from being able to interact with a remote terminal (e.g., a POS or POE terminal 150). If the data contain a ticket (e.g., for a movie, concert, sports, airplane, bus, train, etc.) or coupon, the secure element 130 stores the ticket or coupon in the memory 133 and subsequently redeems the ticket or coupon at a POS or POE terminal 150, even if the mobile communication device 110 does not have network access and thus is offline. If the data contain instructions to increase or decrease the value of a stored value account, debit card, or credit card, the value as stored in the memory 133 is increased or decreased accordingly. If the data contain updates to information about a financial account (e.g. expiration date, billing address, etc), the information is updated in the memory 133. If the data include one or more user-defined payment limits, an e-commerce application on the secure element 130 uses the payment limits to prevent transactions above the limits or to require entry of a PIN code to authorize transactions above the limits. If the data include a list of authorized cell phone numbers, IMEI numbers, and/or serial numbers associated with secure elements that are authorized for peer-to-peer transactions (e.g., funds transfers), the secure element 130 stores the list in the memory 133 and subsequently uses the list to perform peer-to-peer transactions with other secure-element-equipped mobile communications devices that are placed in proximity to the device 110. If the data include a access code (e.g., to provide access to a building, office, apartment, room, vehicle, safety deposit box, etc.), the secure element 130 stores the access code in the memory 133 and subsequently provides the access code to a POE terminal 150 to request access. If the data includes a code to operate an apparatus (e.g., a vehicle or electronic appliance such as a computer, copy machine, washing machine, ATM machine etc), the secure element 130 stores the code in the memory 133 and subsequently provides the code to a remote terminal associated with the apparatus to initiate use of the apparatus. If the data includes a code to provide access to computerized records (e.g., medical records), the secure element 130 stores the code in the memory 133 and subsequently provides the code to a computer to request access to the records. If the data is an image, the image is displayed on the miniature screen 145.

Figure 5:
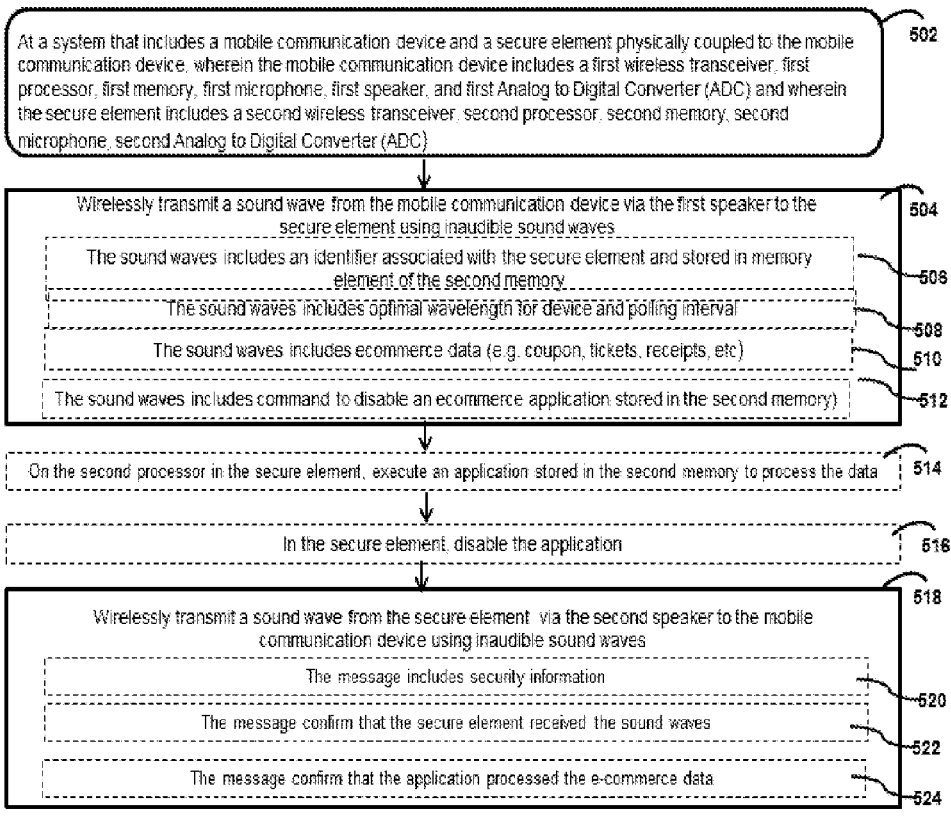
FIG. 5 is a flow diagram illustrating a method of communicating between a mobile communication device and a secure element in accordance with some embodiments.

The secure element performs any housekeeping tasks (476) including checking the available memory capacity. If the memory capacity is less than 50%, the API will delete other ecommerce data (i.e. tickets, coupons, etc) with status equal to redeemed, expired, An API checks the number of security codes. If the number of security codes is less than 50%. The secure element creates and transmits (477) a message (i.e. sound wave) to the mobile communication device 110 confirming that the task has been performed and turn off the microphone 137. The device 110 receives (478) sound waves via the microphone 118 (FIG. 2) and forwards (480) the confirmation to the management server 180, which updates (482) its records accordingly FIGS. 4A-4D provide specific examples of how to use a mobile communication device 110 and associated secure element 130. Attention is now directed to a more generalized method of communication between a mobile communication device 110 and a secure element 130 that is physically coupled to the device 110. Specifically, FIG. 5 is a flow diagram illustrating a method 500 of communicating between a mobile communication device 110 and a secure element 130 in accordance with some embodiments.

The method 500 is performed at a system that includes a mobile communication device 110 and a secure element 130 physically coupled to the mobile communication device 110.

The mobile communication device 110 includes a first wireless transceiver (e.g., the transceiver 122, FIG. 2), first processor (e.g., the processor 123, FIG. 2), first memory (e.g., the memory 126, FIG. 2), first speaker (e.g., the speaker 117, FIG. 2), first microphone (e.g., the microphone 118, FIG. 2) and first Analog to Digital Converter ADC (e.g., the ADC 119, FIG. 2). In some embodiments, the mobile communication device 110 includes a plurality of transceivers (e.g., the transceivers 122 and 129, FIG. 2). The secure element 130 includes a second wireless transceiver (e.g., the transceiver 134 or 136, FIGS. 3A-3C), second processor (e.g., the processor 132, FIGS. 3A-3C), second memory (e.g., the memory 133, FIGS. 3A-3C), second speaker (e.g., the speaker 139, FIGS. 3A-3C), second microphone (e.g., the microphone 137, FIGS. 3A-3C), second Analog to Digital Converter ADC (e.g., the ADC 135, FIGS. 3A-3C), and second Digital to Analog Converter DAC (e.g., the DAC 135b, FIGS. 3A-3C). In some embodiments, the secure element 130 includes a plurality of transceivers (e.g., the transceivers 134 and 136, FIGS. 3A-3C).

In the method 500, data is wirelessly transmitted (504) from the mobile communication device 110, via the first speaker 117, to the secure element 130 via the second microphone 137, using inaudible sound waves. In some embodiments, the sound wave includes a destination address that corresponds (506) to an identifier associated with the secure element 130 (e.g., an IP address of the transceiver 134 or 136) and stored in a memory element (e.g., the memory element 138, FIGS. 3A-3C) of the second memory. For example, the destination address is the identifier. In some examples, all or a portion of the identifier is used as a private IP address assigned to the secure element. In some examples, the secure element 130 includes a chip (e.g. a smart chip 702, FIG. 3D), configured for near-field communications, that includes the second wireless transceiver, second processor, and second memory. Because the chip is configured for near-field communications, it is referred to as an NFC chip. The identifier is the serial number of the NFC chip: for example, the serial number of the NFC chip is 128 bits; these 128 bits are used as a 128-bit IP address of the secure element 130. This 128-bit IP address is used as the destination address in the header of TCP/IP packets sent to the secure element 130.

Examples of data transmitted in the operation 504 include the data transmitted in the operations 426 (FIG. 4B), 442 (FIG. 4C), 466 (FIG. 4D), and 470 (FIG. 4D)

In some embodiments, the sound wave has instructions including (512) a command to disable an application (e.g., an application 720, such as an e-commerce application) stored in the second memory (e.g., as described with respect to the operation 470, FIG. 4D). In response, the application is disabled (516) in the secure element 130 (e.g., in the operation 474, FIG. 4D).

The secure element 130 receives inaudible sound waves via the second microphone (e.g., 137, FIGS. 3A-3C). In some embodiments, prior to the operation 504, the mobile communication device API creates a message with secure element 130 PIN as first 40 bits. The ecommerce data is appended to the SE pin. Alternatively, the secure element is it is first unlocked remotely by the remote server or the remote server downloads the secure element key to the mobile device which then unlocks it per methods described in U.S. patent application Ser. No. 13/184,209, entitled "Method and Systems of loading and unloading digital artifacts between a mobile device with an associated secure element and other remote devices" filed on Jul. 15, 2011. The message is encrypted using 128 bit encryption or some other commercially available encryption. The DAC 119 converts digital signal to an inaudible analog sound wave using the recommended frequency stored in memory in the device 110 with sigma delta conversion. To reduce noise, common dithering techniques may be applied to the sound wave and to ensure quality of the signal, common anti-aliasing techniques may be applied. During transmission, the signal is diffused or bent in radial circumference that is ratio of the wavelength (lambda or λ) and the width of the speaker in the secure element as depicted in FIG. 8. The wavelength is the ratio of the velocity of the transmission and the frequency of the transmission. For example, since the velocity of sound through air is 340 m/s and the sound wave is 10 Mhz, the wavelength is 0.034 meters or 3.4 centimeters. The diffraction is wavelength or 3.4 centimeters divided by the width of the speaker opening which is designed to be 0.476 CM. So, diffraction is approximately 7.14 centimeters or almost 4 inches.

In an alternative embodiment the inaudible sound wave is reflected off the flat reflector 301, spherical reflector 302, or parabolic reflector located at the bottom of the mobile e communication device case 300 ad described previously.

Alternatively, the inaudible sound wave can be reflected off a reflector located on a computer monitor, keyboard, laptop, ebook, or even business card. In this scenario, the user points the mobile communication device at the reflector in the same way they would point a remote control at a television.

Instead of using sound waves, the preceding embodiments can also utilize light waves to transmit the data between the mobile communication device 110 and the secure element 130. The angle of refraction is a function of the angle of incidence and the index of refraction for the material associated with the reflector in accordance with Snells law. For example, the index of refraction for plexi glass is 1.5. The appropriate parameters for calculating the angle of incidence and the index of refraction may be preinstalled in the secure element or downloaded to the secure element or the mobile communication device In some embodiments, after the operation 504, the mobile communication The API extracts the first 40 bits from the message which is the pin for the secure element and uses it to unlock the secure element. Alternatively, the secure element is unlocked remotely by the remote server or the remote server downloads the secure element key to the mobile device which then unlocks it per methods described in U.S. patent application Ser. No. 13/184,209, entitled "Method and Systems of loading and unloading digital artifacts between a mobile device with an associated secure element and other remote devices" filed on Jul. 15, 2011.

For security purposes, distance in which the inaudible signal travels between the mobile device and/or secure element can be minimized. Since distance is speed divided by time, and the speed of sound is roughly 340 meters per second, the distance can be limited by restriction the time transmission of the signal. For small mobile devices such as the Nokia 3220, the distance between the mobile communication device and the secure element affixed to the mobile communication device may be 1 inch or less for example. For medium sized phones such as an iPhone, the distance between the mobile communication device and the secure element affixed to the mobile communication device may be 2 inches or less for example. For large sized phones such as an Android or Sidekick, the distance between the mobile communication device and the secure element affixed to the mobile communication device may be 3 inches or less for example. An API in the secure element and the mobile communication device will determine the appropriate distance based on the mobile communication device make and model.

As an alternatives security precaution the mobile communication device and or the secure element can estimate the distance of the signal. If the distance is greater than the expected amount, the mobile communication device and/or the secure element can reject the signal since the distance may indicate the signal is from an unauthorized or rouge device. For example, if the distance is greater than 2 inches, the mobile communication device and or the secure element may reject the signal. For example, the mobile communication device can send a signal to the secure element with an initial time stamp, T1. The mobile communication device waits for a response from the secure element. When it receives it at time stamp, T2, the mobile communication device can compute the time it took to receive the signal which is T2−T1. The mobile communication device can then estimate the distance of the secure element by dividing the speed of sound of 340 meters per second by the time difference of T2 minus T1. If the distance is greater than expected (e.g. 1 inch, 2 inches, or 3 inches), than signal may indicate that it was originated by a rogue or unauthorized device and the mobile communication device may not process the signal.

In addition to this the inaudible sound waves may also include a unique tone or series of unique tones similar to a digital watermark in a photo to prevent rogue signals from being sent.

Thus, the mobile communication device and/or secure element may perform multifactor authentication which includes the PIN, signal distance or audio watermark, etc.

If the authentication is successful, an API retrieves the 10 digit security code for given transaction and uses it to authenticate the message. An API in the secure element formulates a message to the device 110 that the message has been received and is authentic. The ADC 135 converts the message from digital to analog at 10 Mhz using sigma-delta and transmits it to the device 110.

If the authentication is not successful, the API in the secure element creates an encrypts a message with the mobile device 10 digit number or wallet ID, transaction number, date, time, etc The DAC 135b converts the message from digital to analog at 10 Mhz using sigma-delta and transmits it to the device 110 using diffraction. The device 110 receives the signal via its microphone, decrypts it, converts it to digital, stores it in memory The API also displays a message to the user to contact the help desk and/or customer care center associated with the service provider. If the secure element 130 does not acknowledge the receipt of the first message, the device 110 will resend the message a predetermined number of times until it receives an acknowledgement. If it does not receive an acknowledgment, the secure element 130 will compose a message with the date, time, and transaction number, and error code/description. When it has connectivity with the device 110, it will transmit this message to the device 110 which will send a copy to the management server 180.

In some embodiments, if the secure element microphone 137 is not on prior to data transmission and if the secure element microphone 137 polling interval is not acceptable, an API in the device 110 turns the radio 122 into a modem, establishes a PPP connection with the radio in the secure element, formulates a packet with a message for the SE to turn on its microphone with the unique identifier (i.e. IP address) as the address of the packet, and sends the packet to the receiver 134 or 136.

In some embodiments, if the secure element microphone 137 is on and if the polling interval is within an acceptable time, the microphone 137 in the secure element is turned on via the secure element internal polling process. An API run in the CPU inside the secure element 130 will turn on the internal microphone 137 per polling interval defined during set up from the management server to check for data from the mobile communications device. The API in the secure element creates and encrypts a message requesting if the device 110 has any data to transfer. To accomplish this, the DAC 135b converts the message from digital to analog using the optimal frequency and wavelength determined during setup using sigma-delta, and transmits it via the microphone in the secure element 130 to the device 110. Once the device 110 receives this message, converts it to digital, decrypts it, it can transfer the ecommerce data to the secure element using methods previously described. API in the secure element 130 creates a message confirming receipt of ecommerce data and transmits confirmation message to the device 110 using method previously described. The device 110 sends a copy to the management server 180. The API may turn the microphone 137 off and switch to use the internal battery to sleep mode so as to minimize interference between the internal battery and battery associated with a POS/POE during inductions.

In some embodiments, the sound waves include (510) data (e.g., e-commerce data). Examples of data included in the sound waves include those data described with respect to operations 470 and 472 in the method 460 (FIG. 4D). An application stored in the second memory is executed (514) on the second processor in the secure element 130 to process the data (e.g., as in the operation 474, FIG. 4D). The message confirms (524) that the application processed the data (e.g., as in the operation 476, FIG. 4D).

A message is wirelessly transmitted (518) from the secure element 130, via the speaker 139 to the mobile communication device 110 via its microphone 118, using inaudible sound waves. The sound waves are transferred at 10 Mhz for example. In some embodiments, the first 10 characters of the message will include a unique identifier (e.g., a specific letter) to identify that the message has been sent from the secure element 130. The first character may be randomly generated according to a pre-determined algorithm to prevent spoofing.

In an alternative embodiment the inaudible sound wave is reflected off the flat reflector 301, spherical reflector 302, or parabolic reflector 303 located at the bottom of the mobile e communication device case 300 ad described previously. It should be appreciated that the reflector can be any suitable size, shape, or material.

Alternatively, the inaudible sound wave can be reflected off a reflector located on a computer monitor, keyboard, laptop, ebook, or even business card. In this scenario, the user points the mobile communication device at the reflector in the same way they would point a remote control at a television.

Instead of using sound waves, the preceding embodiments can also utilize light waves to transmit the data between the mobile communication device 110 and the secure element 130. The angle of refraction is a function of the angel of incidence and the index of refraction for the material associated with the reflector in accordance with Snells law. For example, the index of refraction for plexi glass is 1.5. The appropriate parameters for calculating the angle of incidence and the index of refraction may be preinstalled in the secure element or downloaded to the secure element or the mobile communication device Examples of messages transmitted in the operation 518 include the messages transmitted in the operations 430 (FIG. 4B), 452 (FIG. 4C), 468 (FIG. 4D), and 476 (FIG. 4D).

In some embodiments, the message confirms (522) that the secure element received the sound wave In some embodiments, prior to the operation 518, the secure element 130 An API in the secure element 110 creates a message with security code as first 40 bits. The ecommerce data is appended to the security code. Security code is a 10 digit number that is indexed based on transaction number. The secure element for example may be preloaded with 100 unique security codes for the first 100 transactions. After the initial set of security codes are used, the management server 180 will download more to the mobile device 110 which will in turn transfer them to the secure element.

If the mobile wallet application on the mobile device 110 is already open, the wallet will turn on the microphone inside the mobile communication device. The microphone in the mobile communication device receives the analog sound wave from the secure element. The ADC 119 converts the analog signal to digital. The digital message is stored in memory and decrypted. The API in the device 110 extracts the first 80 bits from the message which is the security code and compares the transmitted code with the expected code value using the transaction number as the index of the code. Alternatively, the secure element can be unlocked remotely by the remote server or the remote server downloads the secure element key to the mobile device which then unlocks it per methods described in U.S. patent application Ser. No. 13/184, 209, entitled "Method and Systems of loading and unloading digital artifacts between a mobile device with an associated secure element and other remote devices" filed on Jul. 15, 2011.

If the message is authentic, API formulates and encrypts a message to the Secure element 130 that the message has been received and is authentic. The DAC 135b converts the message from digital to analog at 10 Mhz using sigma-delta and transmits it to the secure element 130. The API then performs any necessary action on the ecommerce data such as deleting relevant commerce data (e.g. deletes ticket or coupon if ticket or coupon was transferred to the device 110). API in the secure element 130 checks the available memory capacity. If the memory capacity is less than 50%, the API will delete other ecommerce data with status equal to redeemed, expired. The API will check the number of security codes. If the number of security codes is less than 50%, API formulates a message indicating this to send to the management server 180 and to request more codes. The ADC 135 converts digital message to sound at 10 Mhz using sigma-delta, and transmits it to the device 110. An API in the secure element creates a message confirming performance of these tasks and transmits this message to the device 110. After receiving an acknowledgement back from the device 110, the API then sets the switch to the internal battery 140 to "sleep mode" so as to minimize interference between the internal battery 140 and battery associated with a POS/POE during inductions In some embodiments, rather than using static codes, a dynamic code is used to verify the authenticity of the message. The secure element or mobile communication device 110 generates a Dynamic Verification Code (DVC) according to an algorithm as previously described in U.S. patent application Ser. No. 13/213,840, entitled, "Transferring Data Between NFC Enabled Mobile Devices With Multiple Secure Elements" filed on Aug. 19, 2011. After the user holds the NFC enabled device near the POS, the POS powers the Secure Element Controller 148 which triggers the designated application (e.g. "transfer songs", transfer EMR") which is determined by the application ID associated with the feature. To reiterate, the application API 724 that is triggered by induction is stored in the secure element of the users NFC enabled mobile device. The Secure Element controller 148 application API transfers the user ID to the POS. The POS transfers a value to the Secure Element Controller. If the POS is capable of "writing" back to NFC enabled devices and secure elements. The Secure Element Controller application API calculates a Dynamic Verification Code (DVC) according to a verification algorithm stored in the secure element and transmits the DVC, UserID, POS value, date, time and any other transaction data according to the DVC algorithm to the POS. To reiterate, the NFC application API's 724 stored in the secure element is different than an application that may reside on a mobile device. The NFC application API's 724 stored in the secure element is designed to activate when the secure element is held in proximity to another NFC enabled device.

The POS transfers the DVC, UserID, POS value, date, time and any other transaction data according to the DVC to a remote server The remote server uses the transaction data it receives from the POS to calculate the DVC according to the same verification algorithm. The UserID is an alphanumeric value such as a social media ID or a numeric value such as a cell phone number or an account number. The remote server uses the UserID to lookup the secure element ID stored at the remote server. The DVC is computed according to the same algorithm stored in the secure element. It uses the value from the POS if provided, the unique ID in the secure element such as the secure element ID, the current date, and time. The algorithm, for example, computes the largest integer resulting from multiplying the secure element ID by the value received from the POS. Then, dividing the result by the concatenation of the current date and military time. For example, if the secure element ID is 12,345,678 and the value provided by the POS is 10,000, then the multiplication of these values results in 123,456,780,000. If the current date is Aug. 19, 2011 and time is 1:00 PM, then the concatenation of the date and military time is 81,920,221,300. 24. The result of dividing 123,456,780,000 by 81,920,221,300 is equal to 1.5. When rounded up to the largest integer, the DVC value is 2. If the POS is not able to "write" a value back to the secure element, then the secure element utilizes a default POS value that is pre-configured in the secure element and is also utilized by the remote server.

The remote server uses the User ID to lookup secure element ID stored in a database at the remote server. Then, the remote server computes the DVC using the secure element ID and the date and time stamp, POS value. If the DVC that it calculates is the same as the DVC that it received, then authentication is successful. At any given time, the remote server can download a new algorithm to the secure element or to the mobile device which transfers it to the secure element. In this way, if an algorithm is compromised, it can be replaced by a new one.

If dynamic Verification Codes are used, additional static codes are not downloaded to the mobile communication device nor the secure element.

If the message is not authentic, the API in the device 110 creates a message with the mobile device 10 digit number or wallet ID, transaction number, date, time, and transmits it to the management server using WIFI or the carrier network. The API also displays a message to the user to contact the help desk and/or customer care center associated with the service provider.

If the wallet API in the device 110 is not activated or open, the user will have to open it. Once the user selects an action to perform (e.g. view account balance and receipt data), the wallet API in the device 110 will turn on the microphone 117 and speaker 118. The wallet API in the device will formulate a request for the appropriate action (e.g. get data for the selected account) and send the request using diffracted sound waves from its speaker 118 to the microphone 137 in the secure element which had been turned on during the induction process of holding the secure element 130 in proximity to the POS/POE associated with the purchase. The API in the secure element 130 will formulate the message with the ecommerce data, convert it to sound waves using ADC 135, encrypt it, and transmit it through the speaker 139 using diffraction to the microphone 118 in the device 110.

Alternatively, the inaudible sound wave can be reflected off a reflector located on a computer monitor, keyboard, laptop, ebook, or even business card. In this scenario, the user points the mobile communication device at the reflector in the same way they would point a remote control at a television.

Instead of using sound waves, the preceding embodiments can also utilize light waves to transmit the data between the mobile communication device 110 and the secure element 130. The angle of refraction is a function of the angle of incidence and the index of refraction for the material associated with the reflector in accordance with Snells law. For example, the index of refraction for plexi glass is 1.5. The appropriate parameters for calculating the angle of incidence and the index of refraction may be preinstalled in the secure element or downloaded to the secure element or the mobile communication device If the wallet API on the device 110 has not received the request in the time it takes for sound to travel through air (i.e. 340 meters per second), the wallet API in the MCD 110 will send another request to the secure element 130. If the requests and data transmission are successful, an API in the secure element 130 will turn off the microphone 137 inside the secure element.

If the secure element 130 does not receive acknowledgment of its original message, it will resend the request a predetermined number of times. If it does not receive an acknowledgment, the secure element 130 creates a message with the secure element serial number, date, time, error message, etc), stores the message until it can be transmitted to the device 110 which sends a copy to the management server 180.

In some embodiments, the message provides transaction data (e.g., as in the operation 452, FIG. 4C). The transaction data are associated with an e-commerce or other transaction. For example, the message provides a receipt from an e-commerce transaction; the receipt includes, for example, a transaction number, transaction amount, transaction date, transaction time, merchant ID, merchant name, product id, product name, location of transaction/merchant, and/or cashier ID. In another example, the message provides an indication of redemption of an electronic coupon. Other examples of transaction data include date, time, amount, and identifier of other secure element from a peer-to-peer funds transfer resulting from holding 2 secure elements in close proximity; a virtual hotel key if the customer checks into a hotel; date, time, and GPS locations associated with unlocking the door of a vehicle, office, home, apartment, or other building; date, time, and GPS location of receiving a coupon from a smart poster or merchant as well as coupon details; date, time, location, physician name, and key information from a doctor visit, medical exam, medical tests, hospital visit; date, time, GPS location of ATM machine, amount of withdrawal; are described with respect to operations 470-478 in the method 460 (FIG. 4D).

The mobile communication device 110 receives the message via the first transceiver (e.g., transceiver 122, FIGS. 3A-3C), or alternatively via another transceiver distinct from the first transceiver (e.g., transceiver 129, FIGS. 3A-3C). In some embodiments, the device 110 receives messages from a cellular service provider (e.g., forward by the cellular service provider but initially transmitted by another party) at a first port, and receives the message from the secure element 130 at a second port distinct from the first port.

In some embodiments, the secure element 130 receives power from a remote terminal (e.g., a POS or POE terminal 150, FIG. 1). For example, the secure element 130 receives power via RF signals transmitted by the remote terminal. The wireless transmission of the message in operation 518 is performed using the power received from the remote terminal when the secure element 130 is in proximity to the remote terminal. In other embodiments, the secure element 130 harvests power from ambient RF signals from the mobile communication device, neighboring electrical devices, or during NFC induction (e.g., using power harvesting circuitry 144, FIG. 3C). The wireless transmission of the message in operation 518 is performed using the harvested power. In still other embodiments, the secure element 130 includes a battery (e.g., a battery 140, FIG. 3B), and the wireless transmission of the message in operation 518 is performed using power from the battery. For example, the secure element 130 determines whether power is available from a nearby remote terminal. If power is not available from the nearby terminal, the message is wirelessly transmitted using power from the battery.

The method 500 thus allows for wireless bi-directional communication between a mobile communication device 110 and associated secure element 130 using an in audible sound wave in both directions. While the method 500 includes a number of operations that appear to occur in a specific order, it should be apparent that the method 500 can include more or fewer operations, which can be executed serially or in parallel. An order of two or more operations may be changed and two or more operations may be combined into a single operation. For example, the order of the operations 504 and 518 may be reversed.

In another embodiment, if the mobile communication device is an older feature phone with limited capabilities including limited memory, limited storage, and limited processing, it may not be able to store and run a rich mobile wallet application necessary to enable the transfer of information between the mobile device and the secure element. So, ringtones which are prevalent in almost all mobile communication devices are used to facilitate the transfer of data between the mobile communication device and the secure element. The commands to transfer the inaudible signals between the mobile communication device and the secure element are stored in the ringtones. Not only do the ringtones store the commands, but they are used as the vehicle to transmit the inaudible signals. Stated another way, if the mobile communication device does not have enough memory to store a rich mobile wallet application or software API's to transfer data, then ringtones are leveraged to do so. Some of the commands that are embedded in ringtones enable the user to add a new payment method, delete a payment method, update their billing information for a payment method, change information for a specific card such as expiration date, deactivate a card, and make one of their many payment methods/cards/accounts the active account for a specific purchase.

In this case, a light weight or thin mobile wallet client may be installed on the older legacy mobile communication device 110 as indicated in U.S. Pat. No. 8,019,365 entitled "Conducting A Payment Using A Secure Element And SMS" granted on Sep. 13, 2011 and U.S. patent application Ser. No. 13/167,829 entitled. "Conducting A Mobile Financial Transaction Using A Secure Element And SMS" filed on Jun. 24, 2011 which is a continuation and claims priority to U.S. patent Ser. No. 11/933,337, entitled "Method And System For Transmitting Data Between A Server And A Mobile Communication Device Using Short Message Service (SMS)" filed on Oct. 31, 2007

During the set up process the user sends a text message to the mobile wallet provider shortcode to register for the mobile wallet lite application. In response to this, the older legacy mobile communication device 110 will receive a text message with a hyperlink which enables the user to download the mobile wallet lite application from the remote server.

The user can register the mobile wallet lite application after they download it. Upon doing so, the user can set up their payment methods in the mobile wallet lite application. Upon doing so, the mobile wallet lite application creates a ringtone for that function utilizing the ringtone composer already pre-installed on the older legacy mobile communication device 110. After creating the ringtone, the user is prompted to save the ringtone and to give it a nick name such as "Visa1" which will enable the user to use their Visa1 card for a particular purchase. Afterwards, the user can activate the ringtone. If the older legacy mobile communication device 110 enables the user to save and activate the ringtone in one step, then this saves the user time and is more convenient.

As an alternative to setting up payment methods (i.e. credit cards, checking account, savings accounts) and/or downloading a thin mobile wallet client using an older legacy mobile communication device 110, the user may set up their payment accounts on a website located at the management server 180. This may be necessary if the older legacy mobile communication device 110 doesn't' have enough memory to run a client application and/or the user does not prefer to set up their payment accounts on an older legacy mobile communication device 110 which may require triple tapping a 16 digit credit card number which is time consuming and prone to error. Upon doing so, the user may receive one or more text messages which have links to download ringtones that have commands embedded in them to transfer data between the mobile device and the secure element using inaudible tones.

Users can also download pre-scripted or canned ringtones for certain standard functions such as retrieving the current receipts from the secure element after a contactless payment and displaying the receipt on the mobile communication device.

In addition to there being different ringtones for different commands (e.g. activate a card, delete a card, add a card, change billing address, get receipts, etc) the user will have a different ringtone for each card or account. For example, "Amex1" will be ringtone for American Express card, Visa1" will be ringtone one for their Visa Card, "Discover1" will be the ringtone for their first Discover card. The mobile communication device will transfer the ringtones to the secure element and a copy to the management server for back up. If the secure element 130 is locked prior to transmission, it is first unlocked remotely by the remote server or the remote server downloads the secure element key to the mobile device which then unlocks it per methods described in U.S. patent application Ser. No. 13/184,209, entitled "Method and Systems of loading and unloading digital artifacts between a mobile device with an associated secure element and other remote devices" filed on Jul. 15, 2011.

When the user wants to make one of their accounts stored in the secure element active, the user will open the mobile wallet lite on the mobile communication device and select the account. The mobile wallet will execute or play the appropriate ringtone (e.g. "Visa1"). Upon doing so, the mobile communication device plays the appropriate inaudible ringtone. The microphone in the secure element 130 listens for the ringtone, converts it to digital, transmits it to the secure element processor for processing. If the secure element 130 is locked prior to transmission, it is first unlocked remotely by the remote server or the remote server downloads the secure element key to the mobile device which then unlocks it per methods described in U.S. patent application Ser. No. 13/184,209, entitled "Method and Systems of loading and unloading digital artifacts between a mobile device with an associated secure element and other remote devices" filed on Jul. 15, 2011.

Since some older legacy mobile communication device 110 enable users to composes a ringtone, the mobile wallet API, leverages this feature to compose the ringtone locally on the mobile communication device and transfer it to the secure element. Stated another way, instead of the management or remote server downloading the ringtone to the mobile communication device or sending an SMW with a link to download the ringtone, the mobile wallet creates the ringtone for the command using the ringtone compose feature favailable in the mobile communication device. The mobile wallet will select the frequency and temp (i.e. beats per minute) that renders the ringtone inaudible, save the ringtone, and transmit a copy to the management server for backup.

In order to transfer data from the secure element 130 to the mobile communication device 110, the secure element transfers an inaudible signal from the speaker 139 in the secure element to the microphone 118 in the mobile communication device. For example, after a contactless payment, the POS may write a receipt to the secure element. The secure element converts the receipt from digital to analog using the DAC 135*b*. The mobile wallet lite application converts the signal from audio to digital using DAC 119, displays the receipt in the mobile wallet lite application. If storage is a problem, the mobile wallet light application may also prompt the user to delete older receipts or other messages to free up space/memory on the mobile device.

As an alternative, the secure element creates a ringtone from the receipt or other transaction data stored in the secure element, converts it to an inaudible analog signal, and transmit it to them bole communication device. The mobile wallet converts it to digital and displays it to the user. If there is no enough storage, the mobile wallet lit will receive the inaudible audio signal, convert it to digital, and transmit it to the SMS inbox via a nonstandard port as described in previous patent applications referenced above.

In another embodiment, the management sever receives receipt from the POS and sends the receipt to them mobile communication device via SMS. The user can display it in the mobile wallet.

In a final embodiment, the mobile wallet can convert the digital receipt to audio and play it so the user can hear the message in addition to reading the message.

In summary, for older legacy mobile communication device 110 ringtones are used both for storing commands and transmission of inaudible signals between the mobile communication device and the secure element.

FIG. 6 is a block diagram illustrating a mobile communication device 110 (e.g., as shown in FIG. 2) in accordance with some embodiments. The device 110 includes a processor 123, one or more communications interfaces 614, memory 126, a user interface 612, and one or more communication buses 610 for interconnecting these components. The communication buses 610 may include circuitry that interconnects and controls communications between system components. The user interface 612 includes the display 124 and keypad 125. The communications interface 614 includes the transceiver 122 and, in some embodiments, the transceiver 129. The memory 126 includes high-speed random access memory, such as DRAM, SRAM, DDR RAM and/or other random access solid state memory devices; and includes non-volatile memory, such as flash memory devices, a magnetic disk storage device, and/or other non-volatile solid state storage devices. The memory 126, or alternately non-volatile memory device(s) within the memory 126, includes a non-transitory computer-readable storage medium. While the memory 126 is shown as being separate from the processor 123, all or a portion of the memory 126 may be embedded in the processor 123. In some embodiments, the memory 126 stores the following programs, modules and data structures, or a subset thereof:

- an operating system 616 that includes procedures for handling various basic system services and for performing hardware dependent tasks;
- a communication module 618 that is used for communicating with other devices (e.g., with the secure element 130 and the management server 180, FIG. 1) via the communications interface 614; and
- applications 620, including one or more e-commerce applications 622 (e.g., ticketing applications; content, item and service purchase applications; and/or payment management applications), games 626, enterprise applications 628, and/or multimedia applications 630.

The communication module 618 also stores an identifier 632 of a secure element 130 that is physically coupled to the mobile communication device 110, for use in transmitting packets to the secure element 130, and the phone number 634 of the mobile communication device 110, for use in receiving messages from the secure element 130.

Associated with the e-commerce application(s) 622 are corresponding APIs for processing data received from other devices (e.g., the secure element 130 and the management server 180, FIG. 1) and data to be transmitted to the other devices. Similar APIs may be associated with the other applications 626, 628, and/or 630.

In some embodiments, the non-transitory computer-readable storage medium of the memory 126 includes instructions for performing all or a portion of the operations shown in the "mobile device communication 110" columns in FIGS. 4A-4D (except for the attaching operation 412, FIG. 4A). Likewise, the memory 126 includes instructions for performing all or a portion of the operations 504-512 in the method 500 (FIG. 5).

Each of the above identified elements in FIG. 6 may be stored in one or more of the previously mentioned memory devices in the memory 126. Each of the above identified modules corresponds to a set of instructions for performing functions described above. The above identified modules or programs (i.e., sets of instructions) need not be implemented as separate software programs, procedures or modules, and thus various subsets of these modules may be combined or otherwise re-arranged in various embodiments. In some embodiments, the memory 126 may store a subset of the modules and data structures identified above. Furthermore, the memory 126 may store additional modules and data structures not described above.

Figure 7:
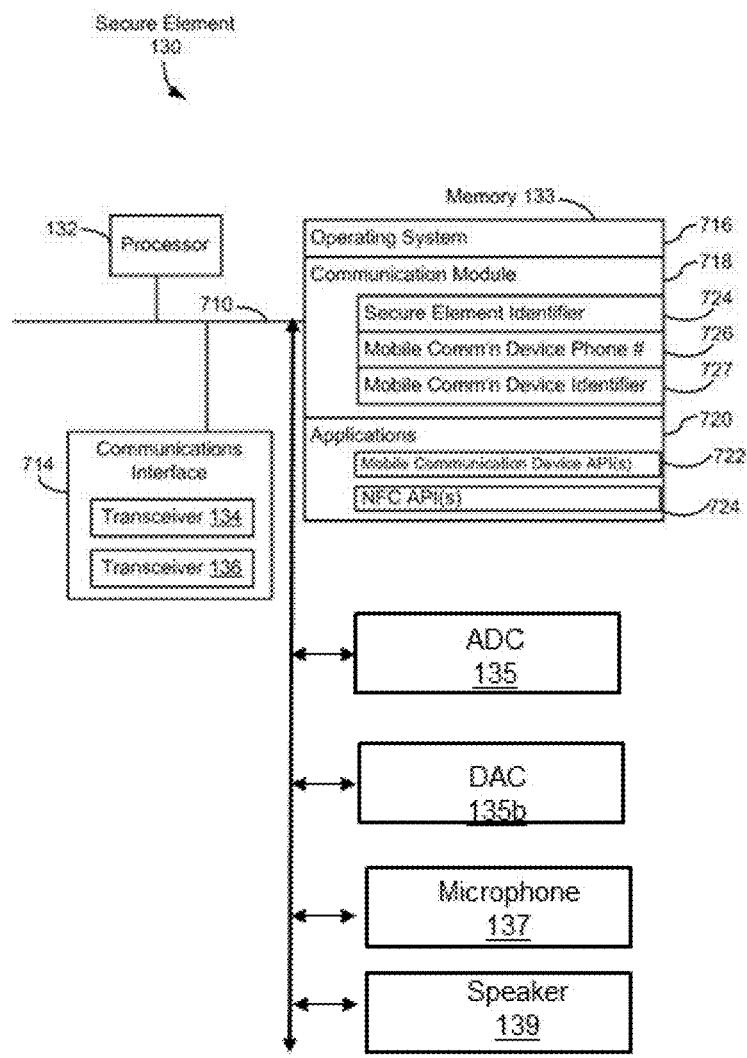
FIG. 7 is a block diagram illustrating a secure element to be physically coupled to a mobile communication device in accordance with some embodiments.

FIG. 7 is a block diagram illustrating a secure element 130 (e.g., as shown in FIGS. 3A-3E) in accordance with some embodiments. The secure element 130 includes a processor 132, one or more communications interfaces 714, memory 133, and one or more communication buses 710 for interconnecting these components. The communication buses 710 may include circuitry that interconnects and controls communications between components. The communications interface 714 includes the transceiver 134 and, in some embodiments, the transceiver 136. The memory 133 includes high-speed random access memory, such as DRAM, SRAM, DDR RAM and/or other random access solid state memory; and includes non-volatile memory, such as flash memory and/or other non-volatile storage. The memory 133, or alternately non-volatile memory within the memory 133, includes a non-transitory computer-readable storage medium. While the memory 133 is shown as being separate from the processor 132, all or a portion of the memory 133 may be embedded in the processor 132. In some embodiments, the memory 133 stores the following programs, modules and data structures, or a subset thereof:

- an operating system 716 that includes procedures for handling various basic system services and for performing hardware dependent tasks;
- a communication module 718 that is used for communicating with other devices (e.g., with the mobile communication device 110 and with POS and POE terminals 150, FIG. 1) via the communications interface 714; and
- one or more applications 720 (e.g., e-commerce applications) and associated APIs 722.
- one or more applications 720 (e.g., e-commerce applications) and associated Near Field Communication (NFC) APIs 724. The NFC API's execute in response to a near field communication trigger from a remote POS, remote POE or another NFC enabled mobile communication device.

The communication module 718 stores an identifier 724 of the secure element 130 (e.g., an identifier of the transceiver 134 or 136), for use in receiving packets from the mobile communication device 110 to which the secure element 130 is physically coupled, and also stores the phone number 726 and identifier 727 of the mobile communication device 110, for use in transmitting messages to the mobile communication device 110.

In some embodiments, the memory 133 includes instructions for performing all of the operations shown in the "secure element 130" columns in FIGS. 4A-4D (except for the attaching operation 412 and charging operation 414, FIG. 4A). Likewise, the memory 126 includes instructions for performing all or a portion of the operations 514-524 in the method 500 (FIG. 5).

Each of the above identified elements in FIG. 7 may be stored in one or more of the previously mentioned components of the memory 133. Each of the above identified modules corresponds to a set of instructions for performing functions described above. The above identified modules or programs (i.e., sets of instructions) need not be implemented as separate software programs, procedures or modules, and thus various subsets of these modules may be combined or otherwise re-arranged in various embodiments. In some embodiments, the memory 133 may store a subset of the modules and data structures identified above. Furthermore, the memory 133 may store additional modules and data structures not described above.

The foregoing description, for purpose of explanation, has been described with reference to specific embodiments. However, the illustrative discussions above are not intended to be exhaustive or to limit the inventions to the precise forms disclosed. Many modifications and variations are possible in view of the above teachings. The embodiments were chosen and described in order to best explain the principles of the inventions and their practical applications, to thereby enable others skilled in the art to best utilize the inventions and various embodiments with various modifications as are suited to the particular use contemplated.

What is claimed is:

1. A system, comprising a mobile communication device and a secure element physically coupled to the mobile communication device, wherein:

the mobile communication device comprises a first wireless transceiver, first processor, and first memory, first speaker, first microphone, and first audio to digital converter;

the secure element comprises a second wireless transceiver, second processor, second memory, second microphone, second speaker, second audio to digital converter; and a second digital to audio converter a second communication channel in which data is transmitted wirelessly between the secure element and the mobile communication device using inaudible sound waves.

2. The system of claim 1, wherein the data between the secure element and the mobile communication device is transferred using inaudible analog sound waves encoded using sigma delta and transmitted at 10 Mhz or less such that the sound is inaudible to the human ear.

3. The system of claim 1 where the secure element transmits inaudible sound waves wirelessly using second speaker to the mobile communication device.

4. The systems of claim 1 where the mobile communication device receives inaudible sound waves from the secure element wirelessly via the first microphone.

5. The systems of claim 1 where the mobile communication device wirelessly transmits inaudible sound waves from the first speaker to the secure element.

6. The system of claim 1 where the secure element receives inaudible sound waves wirelessly from the secure element via the second microphone.

7. The system of claim 1 where in the first microphone in the mobile communication device is turned on when the user opens the mobile wallet on the mobile communication device.

8. The system of claim 1 wherein the sound wave is diffracted or bent when the sound waves travel through the opening of the first speaker in the mobile communication device in such a manner that the sound waves can reach the second microphone in the secure element.

9. The system of claim 1 wherein the sound wave is diffracted or bent when the sound waves travel through the opening of the second speaker in the secure element in such a manner that the sound waves can reach the first microphone in the mobile communication device.

10. The system of claim 1 wherein the frequency of the sound wave emanating from the mobile communication device is optimized for maximum diffraction and is derived from the width of the microphone internal to the mobile communication device.

11. The system of claim 1 wherein the inaudible sound waves are reflected against a flat, parabolic, or spherical reflector located at the bottom of the cell phone case.

12. The system of claim 1 wherein light waves are used to transmit data between the mobile communication device and secure element wherein the light waves reflected against a flat, parabolic, or spherical reflector located at the bottom of the cell phone case.

13. The system of claim 1 wherein ringtones are used to transmit inaudible signals between the mobile communication device and the secure element.

14. The system of claim 1, wherein the secure element is configured to use power received from a remote terminal to transmit data to the mobile communication device during a near field communication induction.

15. The system of claim 1, wherein the secure element uses power from a power harvesting circuitry to harvest power from ambient RF signals.

16. The system of claim 1 where the secure element is powered by an internal battery.

17. The system of claim 3 where the internal battery in the secure element is woken up and exits sleep mode after induction which occurs when the secure element is held in proximity to a POS/POE and an API in the secure element turns the second microphone on.

18. The system of claim 1 wherein he secure element is pre-installed in a mobile communication device case.

19. The system of claim 1 wherein the secure element includes a screen for displaying images.

20. A method, comprising a mobile communication device and a secure element physically coupled to the mobile communication device, wherein: the mobile communication device comprises a first wireless transceiver, first processor, and first memory, first speaker, first microphone, and first audio to digital converter, and secure element which compromises a second, wireless transceiver, second processor, second memory, second microphone, second speaker, a second Audio to Digital converter, and a second Digital To Audio converter;

wirelessly transmitting data between the mobile communication device and the secure element using inaudible sound waves.

21. The method of claim 20 wherein the second channel uses analog sound waves encoded using sigma delta and transmitted at 10 Mhz or less such that the sound is inaudible to the human ear.

22. The method of claim 1 wherein light waves are used to transmit data between the mobile communication device and secure element wherein the light waves reflected against a flat, parabolic, or spherical reflector located at the bottom of the cell phone case.

23. The method of claim 1 wherein ringtones are used to transmit inaudible signals between the mobile communication device and the secure element.

* * * * *